US012754997B2

(12) United States Patent
Solomatnikov et al.

(10) Patent No.: US 12,754,997 B2
(45) **Date of Patent: *Oct. 6, 2026**

(54) SECURE CONTROL FLOW PREDICTION

(71) Applicant: SiFive, Inc., San Mateo, CA (US)

(72) Inventors: Alex Solomatnikov, San Carlos, CA (US); Krste Asanovic, Oakland, CA (US); Yann Loisel, La Ciotat (FR); Cyril Bresch, Marseilles (FR)

(73) Assignee: SiFive, Inc., Santa Clara, CA (US)

( * ) Notice: Subject to any disclaimer, the term of this patent is extended or adjusted under 35 U.S.C. 154(b) by 804 days.

This patent is subject to a terminal disclaimer.

(21) Appl. No.: 17/826,622

(22) Filed: May 27, 2022

(65) Prior Publication Data

US 2022/0292183 A1 Sep. 15, 2022

Related U.S. Application Data

(63) Continuation-in-part of application No. 16/241,455, filed on Jan. 7, 2019, now Pat. No. 11,347,507.

(60) Provisional application No. 62/643,464, filed on Mar. 15, 2018.

(51) Int. Cl.
*G06F 9/30* (2018.01)
*G06F 21/52* (2013.01)

(52) U.S. Cl.
CPC ........ *G06F 21/52* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,276,882 | A | 1/1994 | Emma et al. |
| 5,781,752 | A | 7/1998 | Moshovos et al. |
| 6,505,292 | B1 | 1/2003 | Witt |
| 7,814,299 | B2 | 10/2010 | Hickey et al. |
| 7,849,310 | B2 | 12/2010 | Watt et al. |
| 8,117,403 | B2 | 2/2012 | Heller, Jr. et al. |
| 8,873,329 | B1 | 10/2014 | Zheng et al. |
| 9,063,721 | B2 | 6/2015 | Ghose |
| 10,565,378 | B1 | 2/2020 | Vincent et al. |

(Continued)

OTHER PUBLICATIONS

C. Carruth; "RFC: Speculative Load Hardening (a Spectre variant #1 mitigation)"; Mar. 23, 2018, 21 pages; https://ists.llvm.org/pipermail/llvm-dev/2018-March/122085.html.

(Continued)

*Primary Examiner* — John M Lindlof
(74) *Attorney, Agent, or Firm* — Kilpatrick Townsend & Stockton LLP

(57) ABSTRACT

Systems and methods are disclosed for secure control flow prediction. Some implementations may be used to eliminate or mitigate the Spectre-class of attacks in a processor. For example, an integrated circuit (e.g., a processor) for executing instructions may include a control flow predictor with entries that include branch target addresses associated with instructions. The branch target addresses may be predictions. A context tag associated with an entry may be compared to a context identifier associated with a currently executing process. Responsive to a mismatch between the context tag and the context identifier, the control flow predictor may provide an alternate value in place of a branch target address.

17 Claims, 14 Drawing Sheets

(56) References Cited

U.S. PATENT DOCUMENTS

| | | | | |
|---|---|---|---|---|
| 11,119,784 | B2 | 9/2021 | Branco et al. | |
| 11,315,326 | B2 | 4/2022 | Xu et al. | |
| 2006/0095747 | A1 | 5/2006 | Nancekievill | |
| 2006/0248319 | A1 | 11/2006 | Kadambi | |
| 2007/0255927 | A1 | 11/2007 | Vasekin et al. | |
| 2008/0301420 | A1* | 12/2008 | Inoue | G06F 9/3806 712/240 |
| 2009/0063221 | A1 | 3/2009 | Jonath et al. | |
| 2009/0204785 | A1 | 8/2009 | Yates, Jr. et al. | |
| 2011/0320793 | A1 | 12/2011 | Bell, Jr. et al. | |
| 2013/0145135 | A1* | 6/2013 | Bell, Jr. | G06F 11/30 712/220 |
| 2015/0006855 | A1 | 1/2015 | Gschwind et al. | |
| 2015/0331691 | A1* | 11/2015 | Levitan | G06F 9/3848 712/240 |
| 2017/0123796 | A1 | 5/2017 | Kumar et al. | |
| 2018/0225255 | A1 | 8/2018 | Kang et al. | |
| 2019/0166158 | A1* | 5/2019 | Grocutt | H04L 63/1416 |
| 2019/0227804 | A1* | 7/2019 | Mukherjee | G06F 9/3806 |
| 2019/0324756 | A1 | 10/2019 | Chappell et al. | |
| 2020/0272474 | A1 | 8/2020 | Gabor et al. | |

OTHER PUBLICATIONS

C. Williams; "Three more data-leaking security holes found in Intel chips as designers swap security for speed"; Aug. 14, 2018, pp. 1-12; https://www.theregister.co.uk/2018/08/14/intel_11_terminal_fault_bugs/.

V. Kiriansky, et al.; "Speculative Buffer Overflows: Attacks and Defenses"; Jul. 10, 2018; pp. 1-12.

J. Renau; "Securing Processors from Time Side Channels"; UC Santa Cruz; Apr. 4, 2018; 20 pages; https://escholarship.org/uc/item/6j02r9pw.

K. Khasawneh, et al.; "SafeSpec: Banishing the Spectre of a Meltdown with Leakage-Free Speculation"; Jun. 16, 2018, 12 pages.

K. Asanovic; CS 152 Computer Architecture and Engineering; CS252 Graduate Computer Architecture; Lecture 13—Advanced Out-of-Order Superscalars and Introduction to VLIW; Electrical Engineering and Computer Sciences, University of California at Berkeley; 2018; 39 pages.

M. Yan, et al.; "InvisiSpec: Making Speculative Execution Invisible in the Cache Hierarchy"; 2018; 14 pages.

M. Schwarz, et al.; "NetSpectre: Read Arbitrary Memory over Network"; Jul. 2018; 14 pages.

V. Kiriansky, et al.; "DAWG: a Defense Against Cache Timing Attacks in Speculative Execution Processors"; 2018; 14 pages.

X. Dong, et al.; "Spectres, Virtual Ghosts, and Hardware Support"; HASP; Jun. 2, 2018; Los Angeles, CA; 9 pages.

G. Chen, et al.; "SGXPECTRE Attacks: Stealing Intel Secrets from SGX Enclaves via Speculative Execution"; Jun. 3, 2018; 16 pages.

C. Canella, et al.; "A Systematic Evaluation of Transient Execution Attacks and Defenses"; Nov. 13, 2018; 16 pages.

C. Celio, et al.; "Securing High-performance RISC-V Processors from Time Speculation"; Esperanto Technologies; 8th RISC-V Workshop, Barcelona, Spain; May 7, 2018; 29 pages.

International Search Report and Written Opinion for International application No. PCT/US2019/021998 dated May 30, 2019.

International Search report and Written Opinion for International Application No. PCT/US2019065849 dated Feb. 24, 2020.

SIFIVE. "SiFive U54-MC Core Complex Manual v1p0." Oct. 4, 2017 (Oct. 4, 2017) Retrieved on Feb. 9, 2020 Feb. 9, 2020) from <https://static.dev.sifive.com/U54-MC-RVCorelP.pdf>; entire document.

K. Asanovic; CS 152 Computer Architecture and Engineering; CS252 Graduate Computer Architecture; Lecture 13—Advanced Out-of-Order Superscalars and Introduction to VLIW; Electrical Engineering and Computer Sciences, University of California at Berkeley; Mar. 2018; 39 pages.

M. Yan, et al.; "InvisiSpec: Making Speculative Execution Invisible in the Cache Hierarchy"; Oct. 2018; 14 pages.

V. Kiriansky, et al.; "DAWG: a Defense Against Cache Timing Attacks in Speculative Execution Processors"; Dec. 2018; 14 pages.

* cited by examiner

SECURE CONTROL FLOW PREDICTION

CROSS-REFERENCE TO RELATED APPLICATION(S)

This application is a contination-in-part of U.S. application No. 16/241,455, filed Jan. 7, 2019, which claims priority to and the benefit of U.S. Provisional Patent Application Ser. No. 62/643,464, filed Mar. 15, 2018, the entire disclosures of which are hereby incorporated by reference.

TECHNICAL FIELD

This disclosure relates to secure control flow prediction.

BACKGROUND

Side-channel attacks have been disclosed that rely on processor branch prediction and speculative execution. For Intel x86 processors, the first of these attacks were initially labeled Spectre, other variants or classes of these attacks exist. Briefly, these attacks rely on training branch predictor to execute code chosen by the attacker to load the data into the cache memory after processes/context and/or privilege level change. Target code used by the attacker may be code from target process or from shared library, so it is legal for target process to execute the code. After the attacker process gets control of the processor again, the attacker can measure the time it takes to read the data, thereby determining if the data is present in the cache, and determining what is the data in the target process. Mitigating these attacks is important for secure and reliable computing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
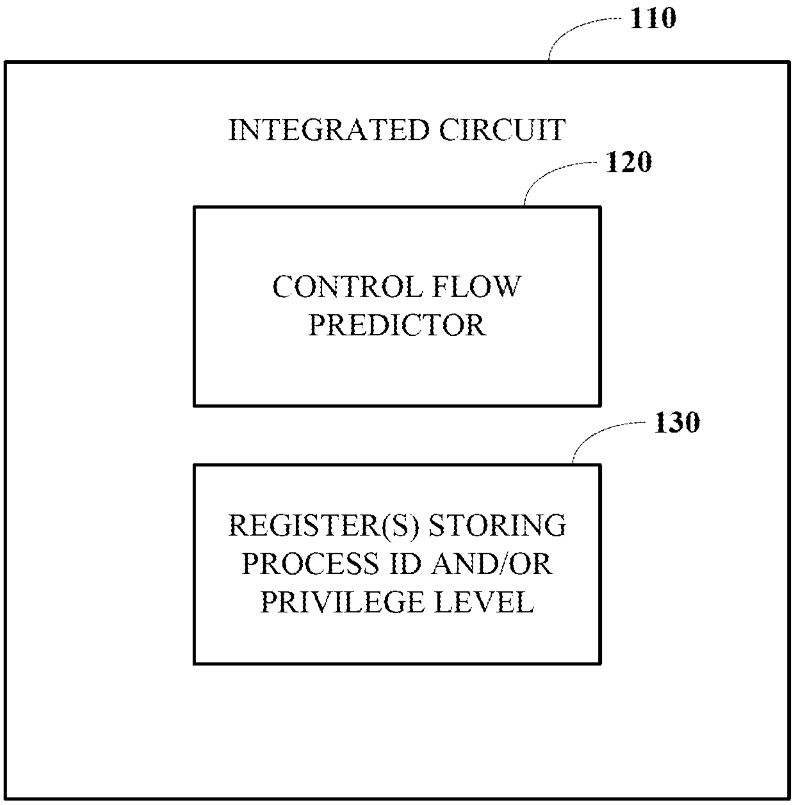
FIG. 1 is block diagram of an example of an integrated circuit for executing instructions with secure control flow prediction.

Disclosed herein are implementations of secure control flow prediction. Some implementations may be used to eliminate or mitigate the possibility of Spectre-class attacks on a processor, e.g., CPUs such as x86, ARM, and/or RISC-V CPUs.

In a first aspect, the subject matter described in this specification can be embodied in integrated circuit for executing instructions that includes one or more registers configured to store a currently executing process identifier and a currently executing privilege level, an instruction decode buffer configured to store instructions fetched from memory while they are decoded for execution, and a control flow predictor with entries that include respective process identifiers and privilege levels. The integrated circuit is configured to access a first process identifier and a first privilege level in one of the entries that is associated with a control flow instruction stored in the decode buffer; compare the first process identifier and a first privilege level to, respectively, the currently executing process identifier and the currently executing privilege level; and responsive to a mismatch between the first process identifier and the currently executing process identifier or a mismatch between the first privilege level and the currently executing privilege level, apply a constraint on speculative execution based on control flow prediction for the control flow instruction. In some implementations, the constraint disables use of the one of the entries that is associated with the control flow instruction, preventing control flow prediction for the control flow instruction. In some implementations, the constraint disables use of the one of the entries that is associated with the control flow instruction, and causes speculative execution to proceed based on a prediction for the control flow instruction that is independent of data stored in the control flow predictor. For example, instead of determining the prediction based on data of the control flow predictor, the prediction used may be a static prediction, a prediction based on bits of the control flow instruction, or a prediction based on a random value. In some implementations, the constraint prevents changes in a microarchitectural state of the integrated circuit caused by speculative execution based on a control flow prediction for the control flow instruction prior to validation of the control flow prediction. In some implementations, the constraint prevents update of a cache caused by speculative execution based on a control flow prediction for the control flow instruction prior to validation of the control flow prediction. In some implementations, the constraint prevents cache lines from being evicted and refilled in a cache, in response to cache misses caused by speculative execution, based on a control flow prediction for the control flow instruction prior to validation of the control flow prediction. In some implementations, the constraint prevents generation of transactions on an interconnection of an integrated circuit, in response to cache misses caused by speculative execution, based on a control flow prediction for the control flow instruction prior to validation of the control flow prediction. In some implementations, the constraint prevents cache lines prefetches caused by speculative execution based on a control flow prediction for the control flow instruction prior to validation of the control flow prediction. In some implementations, the constraint prevents update of a translation look-aside buffer caused by speculative execution based on a control flow prediction for the control flow instruction prior to validation of the control flow prediction. In some implementations, the constraint prevents speculative control flow prediction caused by speculative execution based on a control flow prediction for the control flow instruction prior to validation of the control flow prediction.

In a second aspect, the subject matter described in this specification can be embodied in methods that include accessing an indication in an entry in a control flow predictor that is associated with a control flow instruction that is scheduled for execution; determining, based on the indication, whether the entry of the control flow predictor associated with the control flow instruction is activated for use in a current process; responsive to a determination that the entry is not activated for use in the current process, applying a constraint on speculative execution based on control flow prediction for the control flow instruction; and executing the control flow instruction and one or more subsequent instructions subject to the constraint.

In a third aspect, the subject matter described in this specification can be embodied in integrated circuits for executing instructions that includes a control flow predictor with entries that include respective indications of whether the entry has been activated for use in a current process. The integrated circuit is configured to access the indication in one of the entries that is associated with a control flow instruction that is scheduled for execution; determine, based on the indication, whether the entry of the control flow predictor associated with the control flow instruction is activated for use in a current process; and responsive to a determination that the entry is not activated for use in the current process, apply a constraint on speculative execution based on control flow prediction for the control flow instruction.

These and other aspects of the present disclosure are disclosed in the following detailed description, the appended claims, and the accompanying figures.

Systems and methods for secure control flow prediction are disclosed. An integrated circuit (e.g., a processor or microcontroller) may be configured to decode and execute instructions of an instruction set architecture (ISA) (e.g., a RISC V instruction set). The integrated circuit may implement a pipelined architecture. The integrated circuit may include a control flow predictor (e.g., a branch predictor) for improving performance by reducing delays in executing instructions in the pipelined architecture. The control flow predictor includes control flow data arranged in entries that may be used to determine predictions for corresponding control flow instructions.

The entries of the control flow predictor may also include respective indications of whether or not the entry is activated (e.g., authorized) for use in a currently executing process. When an entry is activated for use in a current process, execution using speculative execution based on a prediction based on the entry may proceed normally. When an entry is not activated for use in a current process, a constraint on speculative execution may be applied to execution following the corresponding control flow instruction (e.g., a branch instruction). For example, the constraint on speculative execution may prevent certain updates of a state of the integrated circuit resulting from speculative execution or it may disable speculative execution using the entry altogether. For example, an entry of the control flow predictor may be activated after the first time the corresponding control flow instruction is executed by the current process or after the first time a prediction based on the entry is validated by the current process. For example, with secure control flow prediction, entries of the control flow predictor that may be activated for use in a current process may not be accessed by another process. This may eliminate or mitigate the possibility of Spectre-class attacks.

This constraint on speculative execution may serve to prevent or mitigate side-channel attacks that seek to transfer information between processes using microarchitectural state changes. In this manner, access to information may be better confined to each process of multiple processes running on the integrated circuit. For example, the multiple processes could include different processes within a single operating system. For example, the multiple processes could include processes in different operating systems on the integrated circuit. For example, the multiple processes could include processes related to internet sockets running on the integrated circuit. This structure for an integrated circuit and associated techniques described herein may improve security of the integrated circuit and software running on the integrated circuit.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the term "microarchitectural state" refers to a portion of the state (e.g., bits of data) of an integrated circuit (e.g., a processor or microcontroller) that is not directly accessible by software executed by the integrated circuit. For example, a microarchitectural state may include data stored in a cache and/or data stored by control flow predictor that is used to make predictions about control flow execution.

In some implementations, the control flow predictor may implement a branch target address predictor that is shared between processes executing in separate security domains, contexts, or worlds. For example, the control flow predictor may be shared between a first process executing in a first security domain, context, or world and a second process executing in a second security domain, context, or world. For example, the control flow predictor may be used by the first process during a first period of time, then after a domain, context, or world switch, the control flow predictor may be used by the second process during a second period of time. The control flow predictor may implement the branch target address predictor (e.g., an indirect jump target predictor) to predict branch target addresses that are associated with branch instructions. In some implementations, the branch target address predictor may be a tagged geometric length (TAGE) predictor. The branch target address predictor may have entries including branch target addresses associated with instructions. The entries may be indexed by a program counter and may be associated with process (context) tags (or simply "context tags") which may comprise sets of bits used for identifying ownership of the entries by processes. A process executing in a security domain, context, or world may be associated with a "context identifier," which may comprise a set of bits used for identifying the process. The process may access an entry in the predictor, such as for obtaining a prediction for a branch target address associated with an instruction. Responsive to a match between the context identifier and the context tag (e.g., indicating ownership of the entry by the process), the predictor may provide the prediction (e.g., the branch target address in the entry) to the process. Responsive to a mismatch between the context identifier and the context tag (e.g., indicating ownership of the entry by a different process), the predictor may provide an alternate value (e.g., a fixed value, a calculated value, or a pseudorandom number, other than the branch target address in the entry) to the process. The alternate value may be provided in place of the branch target address. In some implementations, the alternate value may be configured to invoke an exception when loaded into the program counter for executing a next instruction.

As a result, a same control flow predictor may be used between processes executing in separate security domains, contexts, or worlds while reducing the risk associated with a side-channel attack. For example, the same control flow predictor may be shared between a first process executing in a first security domain, context, or world and a second process executing in a second security domain, context, or world, regardless of the first process potentially being a victim process and the second process potentially being an attacker process. The risk associated with a side-channel attack may be reduced in a controlled way by configuring the control flow predictor to provide the alternate value, which may be a known, predetermined value, responsive to the mismatch. This may limit, for example, the second process (e.g., the potential attacker process) in its ability to train the control flow predictor for the first process (e.g., the potential victim process), while allowing both processes to use the control flow predictor.

As used herein, a "world" may refer to a hardware-enforced multi-domain solution, such as SiFive World-Guard, that provides protection against illegal accesses to memories/peripherals from software applications and/or other masters. A world may be associated with a world identifier (WID), as a process may be associated with a process identifier (PID).

Details

FIG. 1 is block diagram of an example of an integrated circuit 110 for executing instructions with secure control flow prediction. For example, the integrated circuit 110 may be a processor, a microprocessor, a microcontroller, or an IP core. The integrated circuit 110 includes a control flow predictor 120 and one or more registers 130 storing a currently executing process identifier and/or a currently executing privilege level. For example, the control flow predictor 120 may include a branch predictor, a branch history table, a branch target buffer, and/or a return address stack predictor. For example, the currently executing process identifier and/or the currently executing privilege level stored in the one or more registers 130 may be updated every time the processor does a context switch to a different process, or switches from user process to the operating system (kernel mode), or from operating system to virtual machine hypervisor (hypervisor mode). In some implementations, each entry of the control flow predictor 120 contains a process identifier and/or a privilege level that may be compared to the currently executing process identifier and/or the currently executing privilege level to determine whether the entry is activated or authorized for normal use in the currently executing process. For example, the control flow predictor 120 may be implemented as the control flow predictor 410 of FIG. 4. For example, the integrated circuit 110 may be used to implement to technique 500 of FIG. 5.

In some implementations, the control flow predictor 120 includes a branch history table (BHT) with entries that respectively have a process identifier and/or a privilege level, which may be compared to the currently executing process identifier and/or the currently executing privilege level to determine whether an entry of the branch history table has been activated for normal use in the current process. In some implementations, the control flow predictor 120 includes a branch target buffer (BTB) with entries that respectively have a process identifier and/or a privilege level, which may be compared to the currently executing process identifier and/or the currently executing privilege level to determine whether an entry of the branch target buffer has been activated for normal use in the current process. In some implementations, the control flow predictor 120 includes a return address stack (RAS) predictor with entries that respectively have a process identifier and/or a privilege level, which may be compared to the currently executing process identifier and/or the currently executing privilege level to determine whether an entry of the return address stack predictor has been activated for normal use in the current process.

In some implementations, when a process identifier or privilege level mismatch occurs, a process identifier and/or a privilege level of a corresponding entry of the control flow predictor 120 (e.g., a branch predictor entry, a BHT entry, a BTB entry, and/or a RAS predictor entry) are updated to the currently executing process identifier and/or the currently executing privilege level if and when a control flow prediction (e.g., a branch prediction) based on the corresponding entry is validated with the current process.

For example, when a process identifier or privilege level mismatch occurs, a constraint may be applied to speculative execution based on a prediction for the control flow instruction (e.g., a branch) generated using the corresponding entry of the control flow predictor 120. In some implementations, when a process identifier or privilege level mismatch occurs, a corresponding entry of the control flow predictor 120 (e.g., a branch predictor entry, a BHT entry, a BTB entry, and/or a RAS predictor entry) is not used for control flow prediction for a pending instruction of the current process. In some implementations, when a process identifier or privilege level mismatch occurs, a corresponding entry of the control flow predictor 120 (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit 110 (e.g., a processor) is discarded. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, translation look-aside buffer (TLB) is not updated, TLB entries are not evicted or refilled and page table is not walked, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

In some implementations (not shown in FIG. 1), an integrated circuit includes a control flow predictor (e.g., a branch predictor) with entries that contain a flag (e.g., a single bit status register), which is set to one when the entry is activated. When a control flow predictor entry is used, its status register is checked. When integrated circuit does a context switch to a different process, or switches from user process to the operating system (kernel mode), or from operating system to virtual machine hypervisor (hypervisor mode), flags of all branch predictor entries are reset to 0. For example, the integrated circuit may be a processor, a microprocessor, a microcontroller, or an IP core. For example, the control flow predictor may include a branch predictor, a branch history table, a branch target buffer, and/or a return address stack predictor. In some implementations, each entry of the control flow predictor contains a flag (e.g., an entry status register), which may be checked to determine whether the entry is activated or authorized for normal use in the currently executing process. For example, the control flow predictor may be implemented as the control flow predictor 410 of FIG. 4. For example, the integrated circuit may be used to implement to technique 500 of FIG. 5.

In some implementations, the control flow predictor includes a branch history table (BHT) with entries that respectively have flags (e.g., an entry status register), which may be checked to determine whether an entry of the branch history table has been activated for normal use in the current process. A flag of an entry may be set to one when the branch predictor entry is activated. In some implementations, the control flow predictor includes a branch target buffer (BTB) with entries that respectively have flags (e.g., an entry status register), which may be checked to determine whether an entry of the branch target buffer has been activated for normal use in the current process. A flag of an entry may be set to one when the branch target buffer entry is activated. In some implementations, the control flow predictor includes a return address stack (RAS) predictor with entries that respectively have flags (e.g., an entry status register), which may be checked to determine whether an entry of the return address stack predictor has been activated for normal use in the current process. A flag of an entry may be set to one when the RAS predictor entry is activated.

In some implementations, when a flag of the entry (e.g., an entry status register) is not set, the flag of the corresponding entry of the control flow predictor (e.g., a branch predictor entry, a BHT entry, a BTB entry, and/or a RAS predictor entry) is set to 1 if and when a control flow prediction (e.g., a branch prediction) based on the corresponding entry is validated with the current process. In some implementations, all control flow predictor entries (e.g., BHT, BTB, and/or RAS) are invalidated (e.g., their flags are cleared) upon the occurrence of a context switch or privilege level change.

For example, when a flag of the entry (e.g., an entry status register) is not set, a constraint may be applied to speculative execution based on a prediction for the control flow instruction (e.g., a branch) generated using the corresponding entry of the control flow predictor. In some implementations, when a flag of the entry (e.g., an entry status register) is not set, a corresponding entry of the control flow predictor (e.g., a branch predictor entry, a BHT entry, a BTB entry, and/or a RAS predictor entry) is not used for control flow prediction for a pending instruction of the current process. In some implementations, when a flag of the entry (e.g., an entry status register) is not set, a corresponding entry of the control flow predictor (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit (e.g., a processor) is discarded. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, translation look-aside buffer (TLB) is not updated, TLB entries are not evicted or refilled and page table is not walked, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

Figure 2:
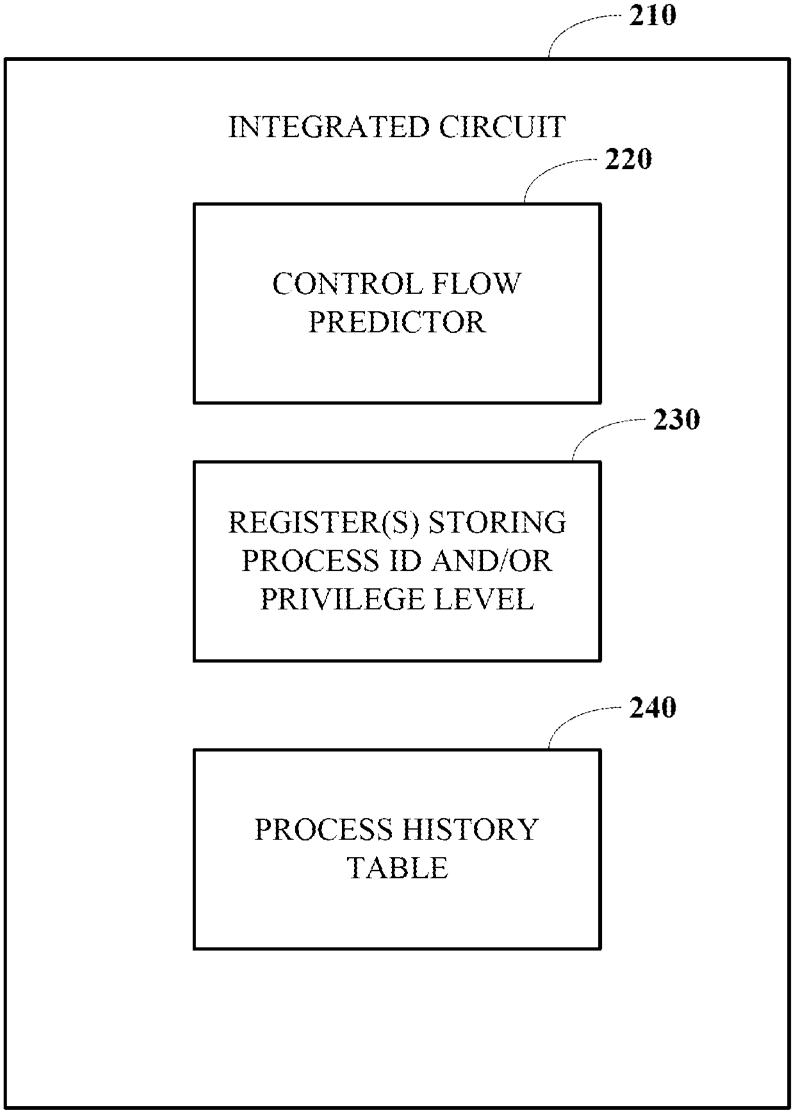
FIG. 2 is block diagram of an example of an integrated circuit for executing instructions with secure control flow prediction.

FIG. 2 is block diagram of an example of an integrated circuit 210 for executing instructions with secure control flow prediction. For example, the integrated circuit 210 may be a processor, a microprocessor, a microcontroller, or an IP core. The integrated circuit 210 includes a control flow predictor 220, one or more registers 230 storing a currently executing process identifier and/or a currently executing privilege level, and a process history table 240 with entries that include respective process identifiers and/or privilege levels. For example, the control flow predictor 220 may include a branch predictor, a branch history table, a branch target buffer, and/or a return address stack predictor. For example, the currently executing process identifier and/or the currently executing privilege level stored in the one or more registers 130 may be updated every time the processor does a context switch to a different process, or switches from user process to the operating system (kernel mode), or from operating system to virtual machine hypervisor (hypervisor mode). The process history table 240 may be configured to be indexed using a process history table index. In some implementations, each entry of the control flow predictor 220 may include a process history table (PHT) index, which may be used to access (e.g., read) an entry of the process history table 240 to compare a process identifier and/or a privilege level stored in the PHT entry to the currently executing process identifier and/or the currently executing privilege level to determine whether the entry is activated or authorized for normal use in the currently executing process. For example, the control flow predictor 220 may be implemented as the control flow predictor 410 of FIG. 4. For example, the integrated circuit 110 may be used to implement to technique 500 of FIG. 5.

For example, the process history table 240 may be implemented as a circular buffer with N entries including respective process identifiers and privilege levels for the last N processes to be executed. The process history table 240 may be updated when a current process is switched by writing a corresponding new process identifier and new privilege level in the entry at a next head of the circular buffer of the process history table. For example, when the integrated circuit 210 (e.g., a processor) does a context switch, a new process identifier and/or a new privilege level may be written in the head of the circular buffer of the process history table 240. In some implementations, entries of control flow predictor 220 may contain a respective PHT index, with N values corresponding to N entries in process history table 240 and an additional special value (of PHT index) that does not correspond to any entry in the process history table 240. In some implementations, if an entry of the control flow predictor 220 has a PHT index equal to the special value, the process history table 240 is not accessed and this case is always treated as process identifier or privilege level mismatch. In some implementations, in the event of process history table 240 wraparound and overwrite of a previously written process identifier and/or privilege level, all entries of the control flow predictor 220 (e.g., a branch predictor entry, a BHT entry, a BTB entry, and/or a RAS predictor entry) may have their respective process history table index reset to the special value to indicate that the entry is not activated for normal use with the current process. In some implementations, in the event of process history table 240 wraparound and overwrite of a previously written process identifier and/or privilege level, only entries of the control flow predictor 220 (e.g., a branch predictor entry, a BHT entry, a BTB entry, and/or a RAS predictor entry) that point to the overwritten entry of the process history table 240 have their respective process history table index reset to the special value to indicate that the entry is not activated for normal use with the current process.

In some implementations, the control flow predictor 220 includes a branch history table (BHT) with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the branch history table has been activated for normal use in the current process. In some implementations, the control flow predictor 220 includes a branch target buffer (BTB) with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the branch target buffer has been activated for normal use in the current process. In some implementations, the control flow predictor 220 includes a return address stack (RAS) predictor with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the return address stack predictor has been activated for normal use in the current process.

In some implementations, when a process identifier or privilege level mismatch occurs or special value of the process history table index is accessed, a process history table index of a corresponding entry of the control flow predictor 220 (e.g., a branch predictor entry, a BHT entry, a BTB entry, and/or a RAS predictor entry) is updated to the current head of process history table 240 if and when a control flow prediction (e.g., a branch prediction) based on the corresponding entry is validated with the current process.

For example, when a process identifier or privilege level mismatch occurs or special value of the process history table index is accessed or special value of the process history table index is accessed, a constraint may be applied to speculative execution based on a prediction for the control flow instruction (e.g., a branch) generated using the corresponding entry of the control flow predictor 220. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is not used for control flow prediction for a pending instruction of the current process. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit 210 (e.g., a processor) is discarded. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, translation look-aside buffer (TLB) is not updated, TLB entries are not evicted or refilled and page table is not walked, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

Figure 3:
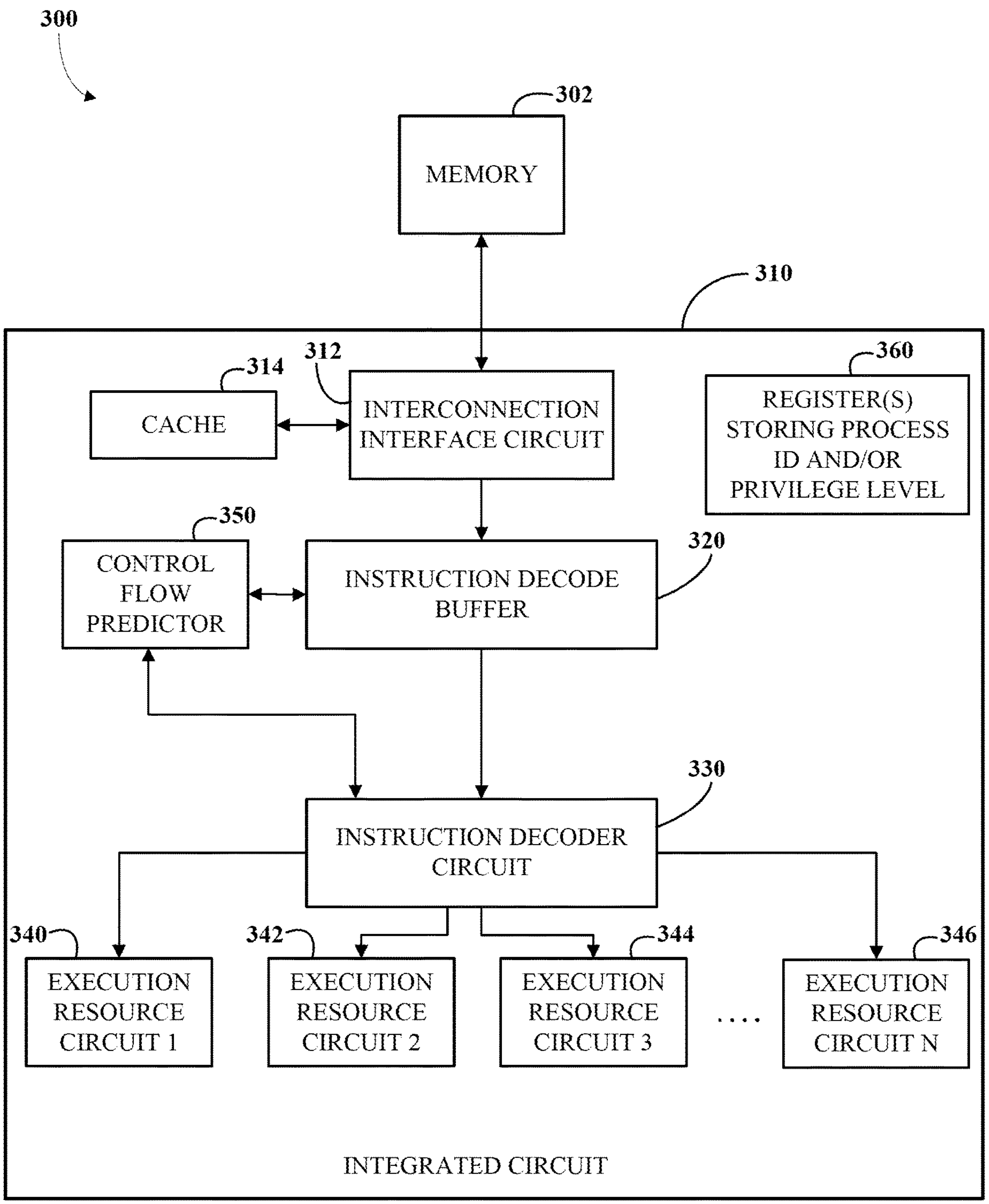
FIG. 3 is block diagram of an example of a system for executing instructions with secure control flow prediction.

FIG. 3 is block diagram of an example of a system 300 for executing instructions with secure control flow prediction. The system 300 includes a memory 302 storing instructions and an integrated circuit 310 configured to execute the instructions. For example, the integrated circuit 310 may be a processor, a microprocessor, a microcontroller, or an IP core. The integrated circuit 310 includes an interconnection interface circuit 312; a cache 314; an instruction decode buffer 320 configured to store instructions that have been fetched from the memory 302; an instruction decoder circuit 330 configured to decode instructions from the instruction decode buffer 320 and pass corresponding micro-ops to one or more execution resource circuits (340, 342, 344, and 346) for execution; a control flow predictor 350; and one or more registers 360 storing a currently executing process identifier and/or a currently executing privilege level. For example, the control flow predictor 350 may be implemented as the control flow predictor 410 of FIG. 4. For example, the integrated circuit 310 may be configured to implement the technique 500 of FIG. 5.

The interconnection interface circuit 312 (e.g., a bus interface circuit) is configured to transfer data to and from external devices including the memory 302. For example, the interconnection interface circuit 312 may be configured to fetch instructions from the memory 302 and store them in the instruction decode buffer 320 while the instructions are processed by a pipelined architecture of the integrated circuit 310. For example, the interconnection interface circuit 312 may be configured to write data resulting from the execution of instructions to the memory 302 during a write back phase of a pipeline. For example, the interconnection interface circuit 312 may fetch a block of data (e.g., instructions) using a direct memory access (DMA) channel. The interconnection interface circuit 312 may be configured to use the cache 314 to optimize data transfers.

The integrated circuit 310 includes an instruction decode buffer 320 configured to store instructions fetched from memory 302 while they are decoded for execution. For example, the instruction decode buffer 320 may have a depth (e.g., 4, 8, 12, 16, or 24 instructions) that facilitates a pipelined and/or superscalar architecture of the integrated circuit 310. The instructions may be members of an instruction set (e.g., a RISC V instruction set, an x86 instruction set, an ARM instruction set, or a MIPS instruction set) supported by the integrated circuit 310.

The integrated circuit 310 includes one or more execution resource circuits (340, 342, 344, and 346) configured to execute instructions or micro-ops to support an instruction set. For example, the instruction set may be a RISC V instruction set. For example, the one or more execution resource circuits (340, 342, 344, and 346) may include an adder, a shifter (e.g., a barrel shifter), a multiplier, and/or a floating point unit. The one or more execution resource circuits (340, 342, 344, and 346) may update the state of the integrated circuit 310, including internal registers and/or flags or status bits (not explicitly shown in FIG. 3) and micro architectural state based on results of executing instructions. Results of execution of an instruction may also be written to the memory 302 (e.g., during subsequent stages of a pipelined execution).

The integrated circuit 310 includes an instruction decoder circuit 330 configured to decode the instructions in the instruction decode buffer 320. The instruction decode buffer 320 may convert the instructions into corresponding micro-ops that are internally executed by the integrated circuit 310 using the one or more execution resource circuits (340, 342, 344, and 346). The instruction decoder circuit 330 is configured to use predictions from the control flow predictor 350 to schedule instructions for execution and implement speculative execution.

The integrated circuit 310 includes a control flow predictor 350 with entries that include respective indications of whether the entry has been activated for use in a current process. The entries of the control flow predictor 350 may also store data (e.g., a counter) used to determine predictions for a control flow instruction. The indications may be used to improve security for data processed by the integrated circuit 310 by reducing the opportunity for interactions between different processes via the control flow predictor 350 and/or other parts of a microarchitectural state of the integrated circuit 310. In some implementations, the indication for entry of control flow predictor 350 may include a process identifier. The process identifier for an entry may indicate that the entry is activated for normal use with the process corresponding to the process identifier. In some implementations, the indication for entry of control flow predictor 350 may include a privilege level. The process identifier for an entry may indicate that the entry is activated for normal use with the process with a privilege level matching (e.g., = or >=) the privilege level of the entry. For example, the control flow predictor 350 may include entries that include respective process identifiers and privilege levels. In some implementations, the indication for entry of control flow predictor 350 may include a process history table index, which points to an entry in a process history table (e.g., the process history table 240) (not shown in FIG. 3). The process history table index for an entry of the control flow predictor 350 may be used to access a process identifier and/or a privilege level from a process history table, which can be compared to the currently executing process identifier and a currently executing privilege level to determine whether the entry is activated for normal use with the current process. In some implementations, the indication for entry of control flow predictor 350 may include a flag that is set when the entry is activated for a current process and cleared when a process switch occurs. The flag for an entry of the control flow predictor 350 may be checked to determine whether the entry is activated for normal use with the current process.

For example, the control flow predictor 350 may include a branch predictor, a branch history table, a branch target buffer, and/or a return address stack predictor. In some implementations, the control flow predictor 350 includes a branch history table with entries that include respective process identifiers and privilege levels. In some implementations, the control flow predictor 350 includes a branch target buffer with entries that include respective process identifiers and privilege levels. In some implementations, the control flow predictor 350 includes a return address stack predictor with entries that include respective process identifiers and privilege levels.

An indication for an entry of the control flow predictor 350 may be used to determine whether the entry of the control flow predictor 350 associated with a control flow instruction is activated for use in a current process, so that speculative execution may be constrained when appropriate to prevent or mitigate side-channel attacks between processes. In some implementations, where the indication includes a process identifier and a privilege level, the integrated circuit 310 may be configured to access a first process identifier and a first privilege level in one of the entries that is associated with a control flow instruction stored in the decode buffer; compare the first process identifier and a first privilege level to, respectively, the currently executing process identifier and the currently executing privilege level; and, responsive to a mismatch between the first process identifier and the currently executing process identifier or a mismatch between the first privilege level and the currently executing privilege level, apply a constraint on speculative execution based on control flow prediction for the control flow instruction.

The constraints on speculative execution based on control flow prediction for a control flow instruction can take many forms. For example, the constraint may disable use of the one of the entries that is associated with the control flow instruction, preventing control flow prediction for the control flow instruction. In some implementations, the entry that is associated with the control flow instruction is discarded (e.g., deleted or reset to a default value). For example, the constraint may prevent changes in a microarchitectural state (e.g., the cache 314) of the integrated circuit caused by speculative execution based on a control flow prediction for the control flow instruction prior to validation of the control flow prediction. For example, the constraint may prevent cache lines from being evicted and refilled in a cache and prevent generation of transactions on an interconnection (e.g., via the interconnection interface circuit 312) of the integrated circuit 310 in response to cache misses caused by speculative execution based on a control flow prediction for the control flow instruction prior to validation of the control flow prediction. For example, the constraint may prevent update of a cache caused by speculative execution based on a control flow prediction for the control flow instruction prior to validation of the control flow prediction. For example, the constraint may prevent cache lines prefetches caused by speculative execution based on a control flow prediction for the control flow instruction prior to validation of the control flow prediction. For example, the constraint may prevent update of a translation look-aside buffer caused by speculative execution based on a control flow prediction for the control flow instruction prior to validation of the control flow prediction. For example, the constraint may prevent speculative control flow prediction caused by speculative execution based on a control flow prediction for the control flow instruction (e.g., nested speculative execution) prior to validation of the control flow prediction.

The indication for an entry of the control flow predictor 350 may be updated to activate the entry for use with a current process after a safety condition has occurred. In some implementations, the indication may be updated after the first use, regardless of the outcome of the prediction generated during the first use. In some implementations, the indication may be updated after fixed number of uses. In some implementations, the indication may be updated after a prediction made for the current process based on the entry has been validated. For example, responsive to validation of a prediction for the control flow instruction by the control flow predictor, the process identifier and the privilege level of the entry that is associated with a control flow instruction may be updated to, respectively, the currently executing process identifier and the currently executing privilege level.

The integrated circuit 310 includes one or more registers 360 configured to store a currently executing process identifier and a currently executing privilege level. For example, the integrated circuit 310 may be configured to update the currently executing process identifier and the currently executing privilege level stored in the one or more registers when the integrated circuit performs a context switch to a different process, or switches from a user process to an operating system, or switches from an operating system to a virtual machine hypervisor.

Figure 4:
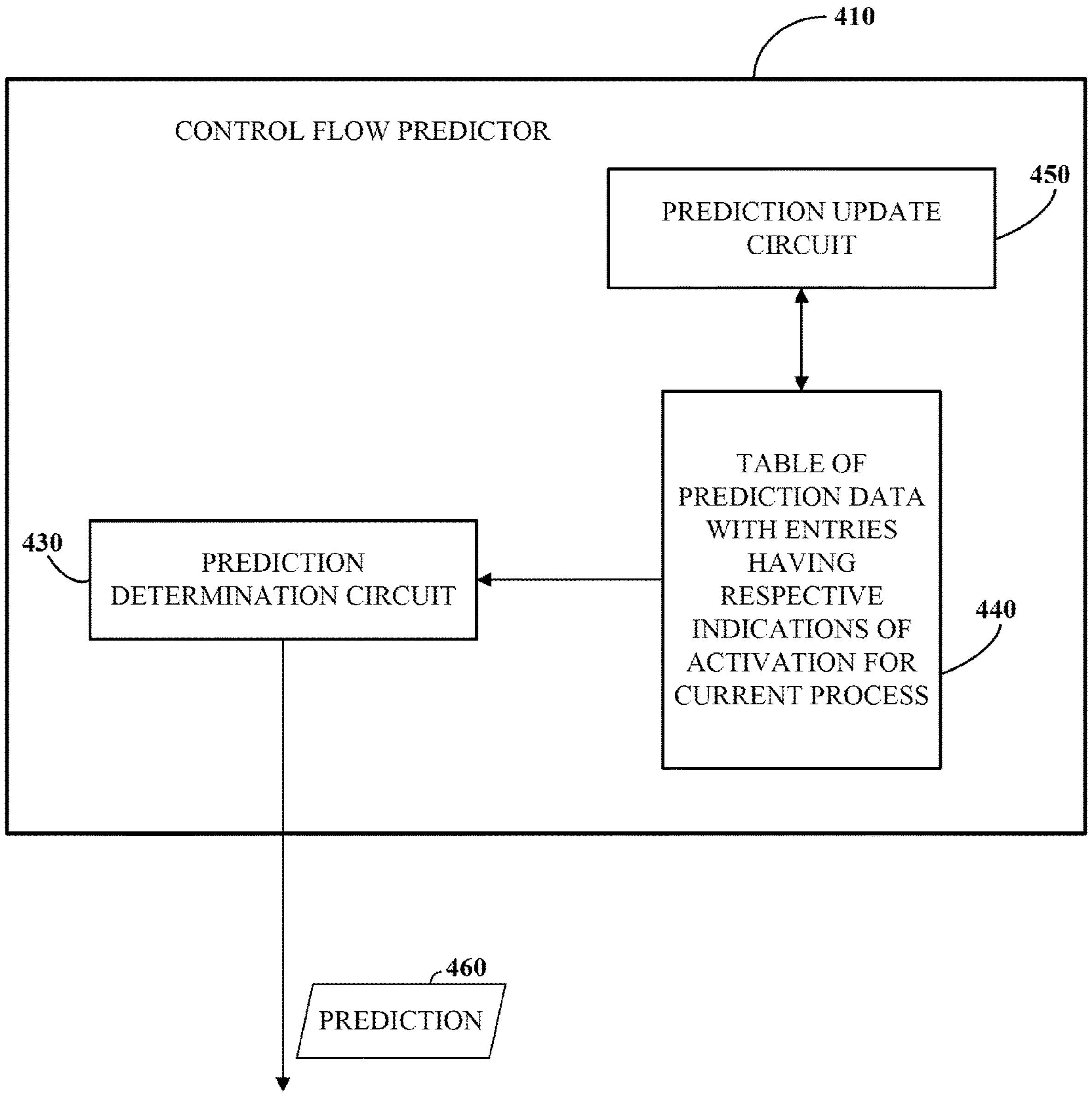
FIG. 4 is block diagram of an example of a control flow predictor for secure control flow prediction.

FIG. 4 is block diagram of an example of a control flow predictor 410 for secure control flow prediction. The control flow predictor 410 includes a prediction determination circuit 430; a table of prediction data 440 with entries that includes respective indications of activation for a current process; and a prediction update circuit 450. The prediction determination circuit is configured to determine a prediction 460 for a control flow instruction based on data in an entry of the table of prediction data 440 corresponding to the subject control flow instruction. However, when the indication (e.g., a flag, a process history table index, a process identifier, and/or a privilege level) of the entry indicates that the entry is not activated for a currently executing process, a constraint may be applied to speculative execution based on the data of the entry. For example, a constraint may alter the prediction 460 or prevent generation of the prediction 460. In some implementations, a constraint may have no effect on the prediction 460, while limiting execution based on the prediction. For example, the control flow predictor 410 may be used in implementing the technique 500 of FIG. 5.

For example, the control flow predictor 410 may include a branch predictor and the prediction 460 may include a prediction of whether a subject branch instruction will be taken. For example, an entry of the table of prediction data 440 may include a respective counter (e.g., a two bit saturating counter) reflecting the frequency at which a corresponding branch instruction has been taken in the recent past. In some implementations, the control flow predictor 410 includes a branch history table. For example, an entry of the table of prediction data 440 may include a respective shift register reflecting the branching history of a corresponding branch instruction in the recent past. For example, entries of the table of prediction data 440 may be indexed by program counter. The prediction determination circuit 430 is configured to determine a prediction 460 for a control flow instruction based on data in an entry of the table of prediction data 440 corresponding to the subject control flow instruction. For example, the prediction 460 for a branch instruction may be "taken" if a saturating counter in a corresponding entry of the table of prediction data 440 is above a threshold.

The entries of the table of prediction data 440 include respective indications of activation for a current process. For example, an entry of the table of prediction data 440 may include a flag (e.g., single bit) indicating whether or not a current process is activated for use with the entry. For example, an entry of the table of prediction data 440 may include a process identifier that identifies a process that is activated for use with the entry, which may be compared to the currently executing process identifier. For example, an entry of the table of prediction data 440 may include a privilege level associated with activation for use with the entry, which may be compared to the currently executing privilege level (i.e., the privilege level of a currently executing process). For example, an entry of the table of prediction data 440 may include a process history table index that points to a process identifier and/or a privilege level that identifies a process that is activated for use with the entry, which may be compared to the currently executing process identifier.

The prediction update circuit 450 is configured to update the table of prediction data 440 after execution of a control flow instruction. For example, when a branch instruction is taken, the prediction update circuit 450 may increment a saturating counter in an entry of the table of prediction data 440 corresponding to the branch instruction. For example, when a branch instruction is not taken, the prediction update circuit 450 may decrement a saturating counter in an entry of the table of prediction data 440 corresponding to the branch instruction. The prediction update circuit 450 may also be configured to update an indication of the corresponding entry. For example, an indication (e.g., a flag, a process history table index, a process identifier, and/or a privilege level) of the entry may be updated to indicate that the entry is activated for use in the current process after execution of the corresponding instruction. In some implementations, an indication (e.g., a flag, a process history table index, a process identifier, and/or a privilege level) of the entry may be updated to indicate that the entry is activated for use in the current process responsive to validation of the prediction 460 made for the corresponding control flow instruction. In some implementations, the prediction update circuit 450 is configured to update all the indications in the table of prediction data 440 when the currently executing process changes. For example, prediction update circuit 450 may be configured to clear flag indications in the entries of the table of prediction data 440 when a context switch occurs.

Figure 5:
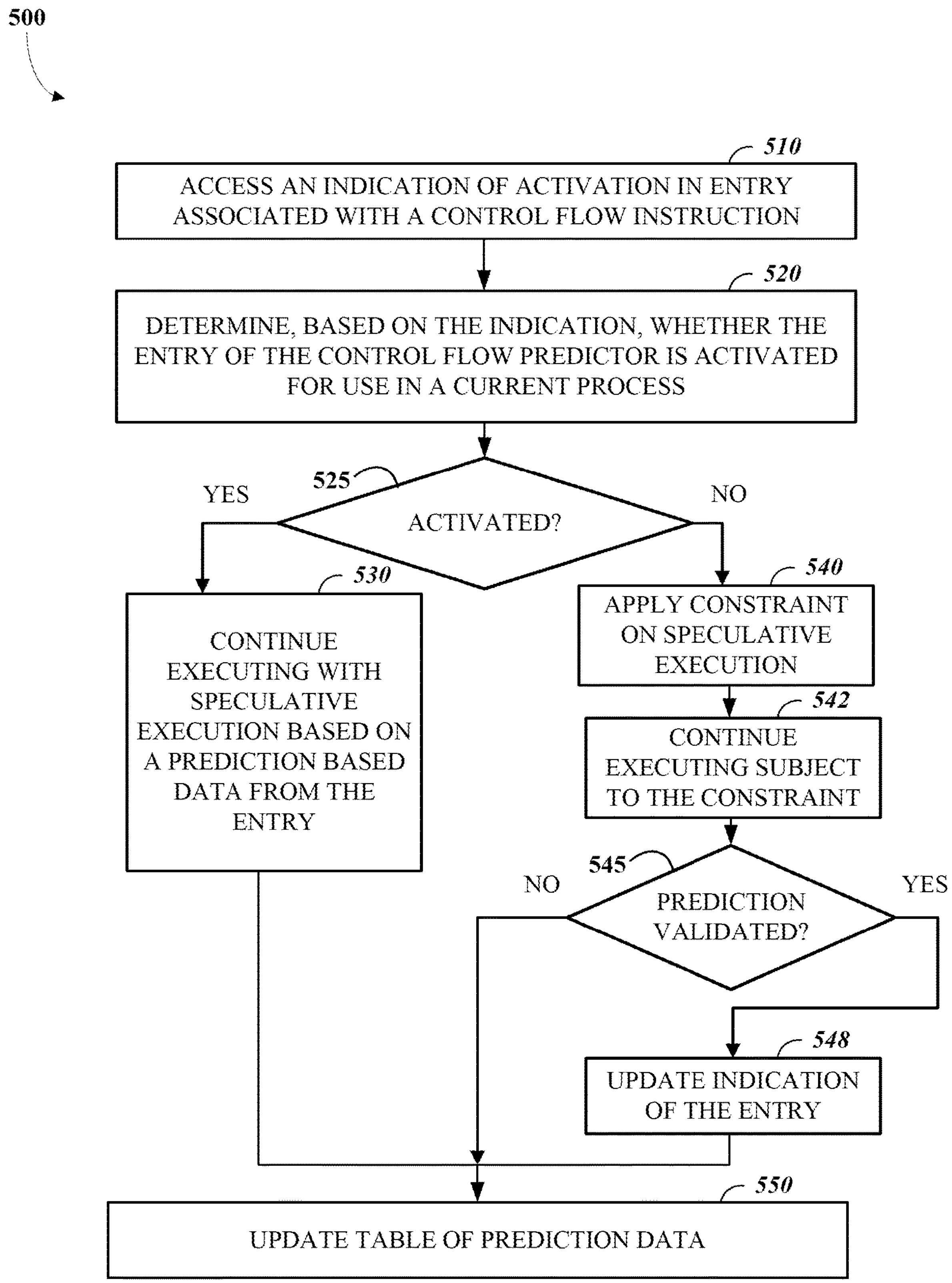
FIG. 5 is flow chart of an example of a technique for executing instructions with secure control flow prediction.

FIG. 5 is flow chart of an example of a technique 500 for executing instructions with secure control flow prediction. The technique 500 includes accessing 510 an indication in an entry in a control flow predictor that is associated with a control flow instruction that is scheduled for execution; and determining 520, based on the indication, whether the entry of the control flow predictor associated with the control flow instruction is activated for use in a current process. The technique 500 may include, responsive to a determination that the entry is activated for use in the current process, continuing to execute 530 with speculative execution based on a prediction based on data from the entry. The technique 500 may include, responsive to a determination that the entry is not activated for use in the current process, applying 540 a constraint on speculative execution based on control flow prediction for the control flow instruction; and executing 542 the control flow instruction and one or more subsequent instructions subject to the constraint. The technique 500 may include, responsive to a determination that the prediction for the flow control instruction has been validated, updating 548 the indication of the entry to activate the entry for use with the current process. The process includes updating a table of prediction data of the control flow predictor. For example, the technique 500 may be implemented using the integrated circuit 110 of FIG. 1. For example, the technique 500 may be implemented using the integrated circuit 210 of FIG. 2. For example, the technique 500 may be implemented using the system 300 of FIG. 3.

The technique 500 includes accessing 510 an indication in an entry in a control flow predictor (e.g., the control flow predictor 410) that is associated with a control flow instruction that is scheduled for execution. For example, the control flow instruction may be a branch instruction or subroutine call instruction. For example, the control flow instruction may be stored in a decode buffer (e.g., the instruction decode buffer 320). In some implementations, the control flow predictor includes a branch history table with entries that include respective indications of whether the entry has been activated for use in a current process. In some implementations, the control flow predictor includes a branch target buffer with entries that include respective indications of whether the entry has been activated for use in a current process. In some implementations, the control flow predictor includes a return address stack predictor with entries that include respective indications of whether the entry has been activated for use in a current process. For example, the indication may include a flag (e.g., a single bit), a process history table index, a process identifier, and/or a privilege level. In some implementations, the entry, including the indication, is selected or identified based on a program counter value associated with the control flow instruction. For example, accessing 510 the indication may include reading the value of the indication and/or passing the value of the indication to a comparator for comparison.

The technique 500 includes determining 520, based on the indication, whether the entry of the control flow predictor associated with the control flow instruction is activated for use in a current process. For example, the technique 600 of FIG. 6 may be implemented to determine 520, based on the indication, whether the entry is activated for use in a current process. For example, the technique 700 of FIG. 7 may be implemented to determine 520, based on the indication, whether the entry is activated for use in a current process. For example, the technique 800 of FIG. 8 may be implemented to determine 520, based on the indication, whether the entry is activated for use in a current process.

If (at operation 525) the entry is activated for use with the current process, then the technique 500 includes continuing to execute 530 instructions with speculative execution based on a prediction (e.g., branch taken or not taken) based on data from the entry (e.g., the value of a saturating counter and/or the value of a branch history shift register). Speculative execution may enable a processor to achieve higher performance by avoiding pipeline delays.

If (at operation 525) the entry is not activated for use with the current process, then the technique 500 includes, responsive to a determination that the entry is not activated for use in the current process, applying 540 a constraint on speculative execution based on control flow prediction for the control flow instruction. For example, the constraint may disable use of the entry that is associated with the control flow instruction, preventing control flow prediction for the control flow instruction. In some implementations, the entry that is associated with the control flow instruction is discarded (e.g., the entry is deleted or reset to a default value). In some implementations, the constraint disables use of the entry that is associated with the control flow instruction, and causes speculative execution to proceed based on a prediction for the control flow instruction that is independent of data stored in the control flow predictor. For example, instead of determining the prediction based on data of the control flow predictor, the prediction used may be a static prediction (e.g., always predict taken or always predict not-taken), a prediction based on bits of the control flow instruction (e.g., backwards→taken and forward→not-taken), or a prediction based on a random value. For example, the constraint may prevent changes in a microarchitectural state (e.g., a cache or data stored in a predictor) of an integrated circuit caused by speculative execution based on a control flow prediction for the control flow instruction prior to validation of the control flow prediction. For example, the constraint may prevent update of a cache caused by speculative execution based on a control flow prediction for the control flow instruction prior to validation of the control flow prediction. For example, the constraint may prevent cache lines from being evicted and refilled in a cache and may prevent generation of transactions on an interconnection of integrated circuit in response to cache misses caused by speculative execution based on a control flow prediction for the control flow instruction prior to validation of the control flow prediction. For example, the constraint may prevent cache line prefetches caused by speculative execution based on a control flow prediction for the control flow instruction prior to validation of the control flow prediction. For example, the constraint may prevent update of a translation look-aside buffer caused by speculative execution based on a control flow prediction for the control flow instruction prior to validation of the control flow prediction. For example, the constraint may prevent speculative control flow prediction (e.g., nested control flow prediction) caused by speculative execution based on a control flow prediction for the control flow instruction prior to validation of the control flow prediction.

The technique 500 includes executing 542 the control flow instruction and one or more subsequent instructions subject to the constraint. In some implementations, the constraint causes execution to continue without speculative execution, thus incurring delays corresponding to the length of an execution pipeline while the results of the control flow instruction are determined. In some implementations, the constraint allows execution to continue with speculative execution, unless and until a modification of microarchitectural state of the integrated circuit (e.g., a processor or microcontroller) is attempted. When a prohibited modification of state is called for by a speculative instruction, the speculative execution may be prevented and delays corresponding to the length of an execution pipeline may be incurred while the results of the control flow instruction are determined.

If (at operation 545) the prediction for the control flow instruction is validated, then the technique 500 includes, responsive to validation of a prediction for the control flow instruction by the control flow predictor, update 548 the indication of the entry that is associated with a control flow instruction to activate the entry for use in the current process. For example, updating 548 the indication of the entry may include setting a flag of the indication. In some implementations (where flag indications are used), an integrated circuit (e.g., a processor) may be configured to clear all of the indications in the control flow predictor when the integrated circuit performs a context switch to a different process, or switches from a user process to an operating system, or switches from an operating system to a virtual machine hypervisor. Thus, setting the flag of the indication activates the entry for unconstrained use in the current process, which may have been recently switched in. For example, updating 548 the indication of the entry may include writing a currently executing process identifier and/or a currently executing privilege level to the indication of the entry, which may be stored in one or more registers (e.g., the one or more registers 360).

Some implementations use a process history table (e.g., the process history table 240) to facilitate the maintenance of indications of activation for entries in the control flow predictor. For example, updating 548 the indication of the entry may include writing a process history table index to the indication of the entry, where the updated index points to a head of a process history table. For example, the process history table may be implemented as a circular buffer with N entries including respective process identifiers and privilege levels for the last N processes to be executed. The process history table may be updated when a current process is switched by writing a corresponding new process identifier and new privilege level in the entry at a next head of the circular buffer of the process history table. In some implementations, responsive to wraparound update of the process history table that overwrites an entry of the process history table, the integrated circuit may reset, to a special value that does not correspond to an entry in a process history table, all process history table indices in the control flow predictor. In some implementations, responsive to wraparound update of the process history table that overwrites an entry of the process history table, the integrated circuit may reset, to the special value, process history table indices in the control flow predictor that point to the overwritten entry of the process history table.

In some implementations (not shown in FIG. 5), the indication for the entry may be updated to activate the entry after execution of the control flow instruction in the current process, regardless of whether a corresponding prediction is validated. Similarly, the entry may be activated after a fixed number (e.g., a number greater than one) of executions of the control flow instruction in the current process.

The technique 500 includes updating 550 a table of prediction data (e.g., the table of prediction data 440 of the control flow predictor. For example, a saturating counter of the entry may be incremented or decremented based on the result of execution of the control flow instruction. For example, a branch history shift register of the entry may have a bit shifted in based on the result of execution of the control flow instruction.

Figure 6:
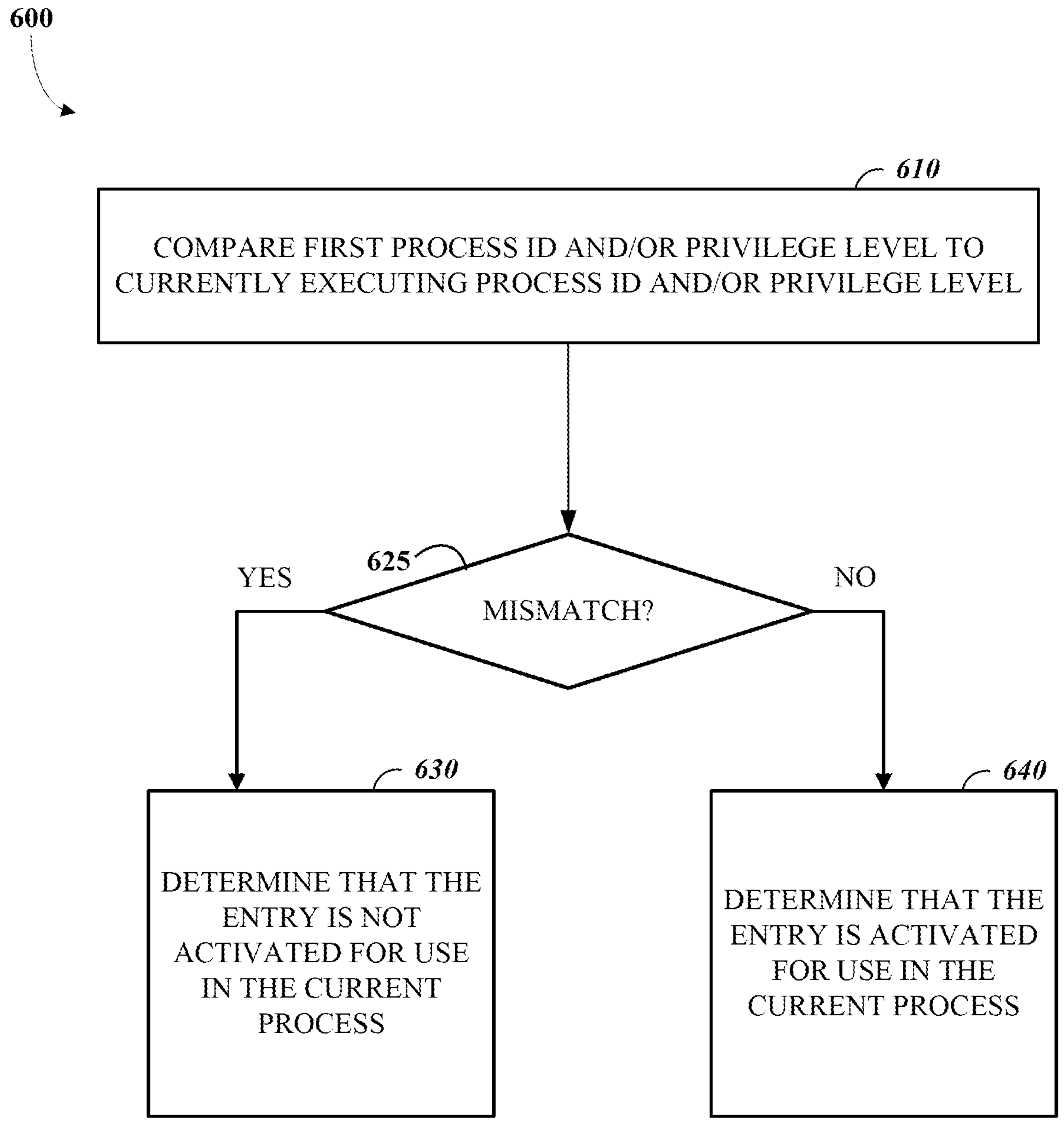
FIG. 6 is flow chart of an example of a technique for determining, based on a process identifier and/or a privilege level, whether an entry of a control flow predictor is activated for use with a current process.

FIG. 6 is flow chart of an example of a technique 600 for determining, based on a process identifier and/or a privilege level, whether an entry of a control flow predictor is activated for use with a current process. The technique 600 includes comparing 610 a first process identifier and/or a first privilege level of the entry to, respectively, the currently executing process identifier and/or the currently executing privilege level. For example, the currently executing process identifier and/or the currently executing privilege level may be stored in one or more registers (e.g., the one or more registers 360) of the integrated circuit. For example, comparing 610 the first process identifier and the currently executing process identifier may include checking for an exact match between the identifiers. In some implementations, comparing 610 the first privilege level and the currently executing privilege level includes checking for an exact match between the privilege levels. In some implementations, comparing 610 the first privilege level and the currently executing privilege level includes checking whether the first privilege level is less than or equal to the currently executing privilege level. For example, a mismatch may occur if the first privilege level is greater than the currently executing privilege level.

If (at operation 625) a mismatch is detected, then, responsive to a mismatch between the first process identifier and the currently executing process identifier or a mismatch between the first privilege level and the currently executing privilege level, determine 630 that the entry is not activated for use in the current process. If (at operation 625) a mismatch is not detected, then, responsive to a match between the first process identifier and the currently executing process identifier and/or a match between the first privilege level and the currently executing privilege level, determine 640 that the entry is activated for use in the current process.

Figure 7:
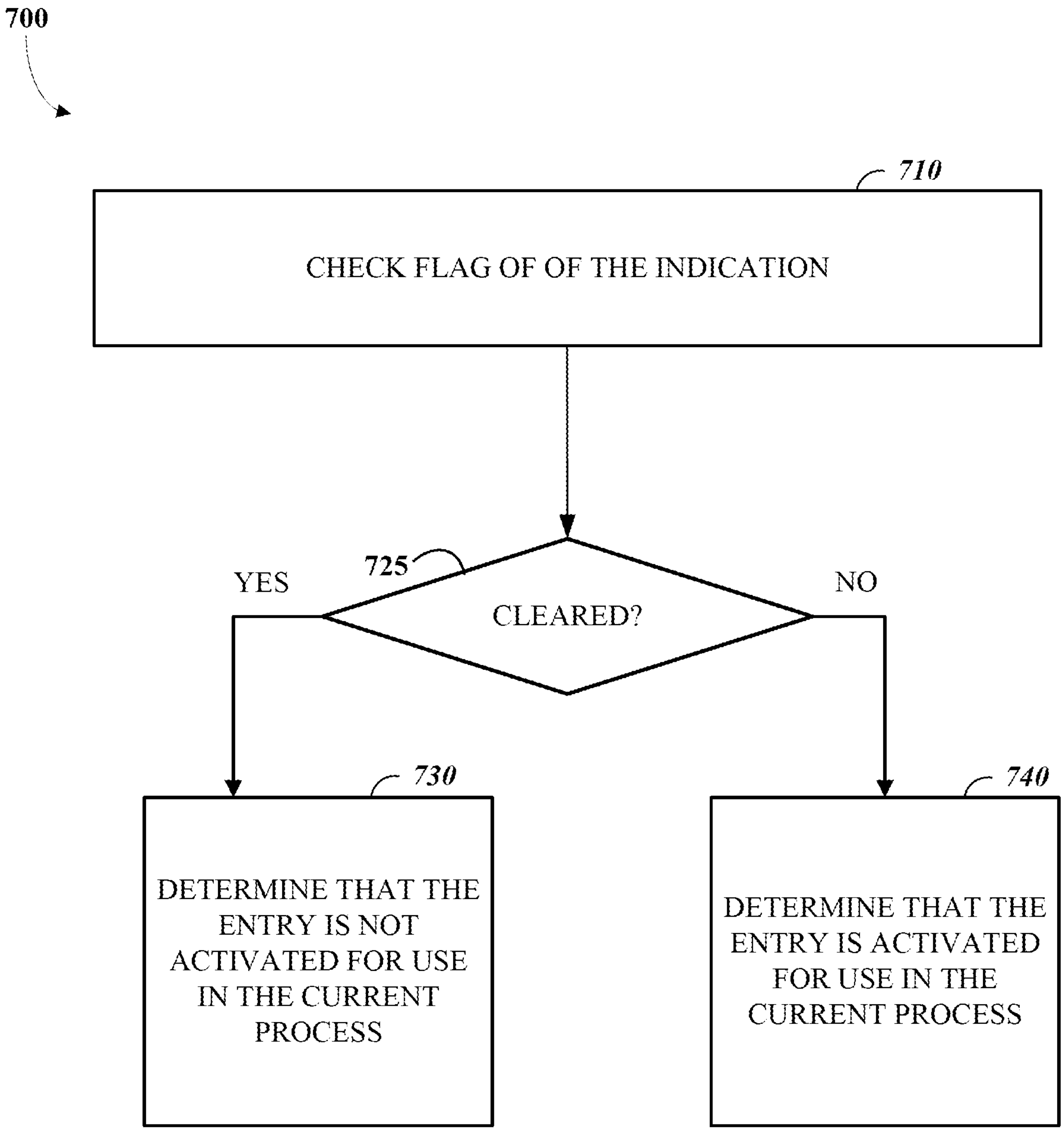
FIG. 7 is flow chart of an example of a technique for determining, based on a flag, whether an entry of a control flow predictor is activated for use with a current process.

FIG. 7 is flow chart of an example of a technique 700 for determining, based on a flag, whether an entry of a control flow predictor is activated for use with a current process. The indication of the entry may include the flag, which may be set when the entry is activated for a current process and cleared when a process switch occurs. The technique 700 includes checking 710 the flag. For example, the flag may be a bit stored in the entry of the control flow predictor. If (at operation 725), the flag is cleared, then the technique 700 includes, responsive to the flag being cleared, determining 730 that the current process is not activated to use the entry. If (at operation 725), the flag is not cleared, then the technique 700 includes, responsive to the flag being set, determining 740 that the entry is activated for use in the current process.

Figure 8:
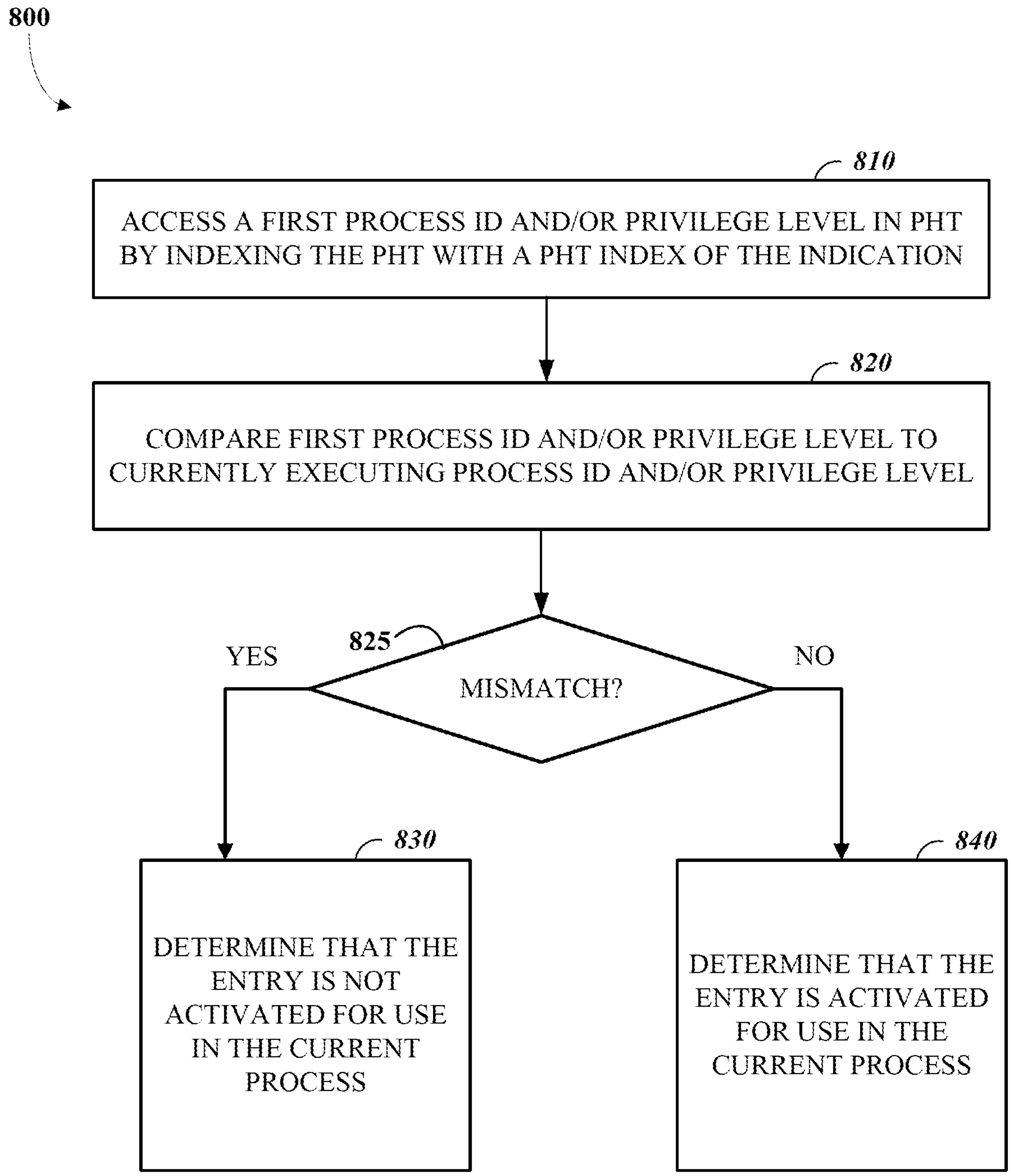
FIG. 8 is flow chart of an example of a technique for determining, using a process history table, whether an entry of a control flow predictor is activated for use with a current process.

FIG. 8 is flow chart of an example of a technique 800 for determining, using a process history table, whether an entry of a control flow predictor is activated for use with a current process. The indication of the entry may include a process history table index. The technique 800 includes accessing 810 a first process identifier and/or a first privilege level in a process history table by indexing the process history table with the process history table index of the indication. The technique 800 includes comparing 820 the first process identifier and/or the first privilege level to, respectively, the currently executing process identifier and/or the currently executing privilege level. For example, the currently executing process identifier and/or the currently executing privilege level may be stored in one or more registers (e.g., the one or more registers 360) of the integrated circuit. For example, comparing 820 the first process identifier and the currently executing process identifier may include checking for an exact match between the identifiers. In some implementations, comparing 820 the first privilege level and the currently executing privilege level includes checking for an exact match between the privilege levels. In some implementations, comparing 820 the first privilege level and the currently executing privilege level includes checking whether the first privilege level is less than or equal to the currently executing privilege level. For example, a mismatch may occur if the first privilege level is greater than the currently executing privilege level.

If (at operation 825) a mismatch is detected, then, responsive to a mismatch between the first process identifier and the currently executing process identifier or a mismatch between the first privilege level and the currently executing privilege level, determine 830 that the entry is not activated for use in the current process. If (at operation 825) a mismatch is not detected, then, responsive to a match between the first process identifier and the currently executing process identifier and/or a match between the first privilege level and the currently executing privilege level, determine 840 that the entry is activated for use in the current process.

In some implementations (not shown in FIG. 8), the process history table index can take a special value (e.g., NULL) that does not correspond to an entry in a process history table. For example, determining whether the entry of the control flow predictor associated with the control flow instruction is activated for use in the current process may include accessing the process history table index of the indication; comparing the process history table index to the special value; and, based on the process history table index matching the special value, determining that the entry is not activated for use in the current process.

Speculative Store Bypass (SSB) is a variant of Spectre vulnerability/attack that exploits a speculation predictor to infer information. For example, a speculation predictor may include a memory disambiguator.

Some of the techniques described above may be applied in a speculation predictor to prevent or mitigate SSB attacks. For example, entries of speculation predictor may include a process identifier and/or a privilege level, which may check against a currently executing process identifier and/or a currently executing privilege level to trigger application of a constraint on speculative execution based on data in the entry of speculation predictor. In some implementations, a speculation predictor may include entries that include respective indications of whether the entry has been activated for use in a current process. For example, the indication may include a flag that is set when the entry is activated for a current process and cleared when a process switch occurs. For example, the indication may include a process history table index.

For example, instead of determining the prediction based on data of the speculation predictor, the prediction used may be a random value. In some implementations, the constraint prevents changes in a microarchitectural state of the integrated circuit caused by speculative execution based on a speculation prediction prior to validation of the speculation prediction. In some implementations, the constraint prevents update of a cache caused by speculative execution based on a speculation prediction prior to validation of the speculation prediction. In some implementations, the constraint prevents cache lines from being evicted and refilled in a cache and prevents generation of transactions on an interconnection of integrated circuit in response to cache misses caused by speculative execution based on a speculation prediction prior to validation of the speculation prediction. In some implementations, the constraint prevents cache lines prefetches caused by speculative execution based on a speculation prediction prior to validation of the speculation prediction. In some implementations, the constraint prevents update of a translation look-aside buffer caused by speculative execution based on a speculation prediction prior to validation of the speculation prediction. In some implementations, the constraint prevents speculative control flow prediction caused by speculative execution based on a speculation prediction prior to validation of the speculation prediction.

Figure 9:
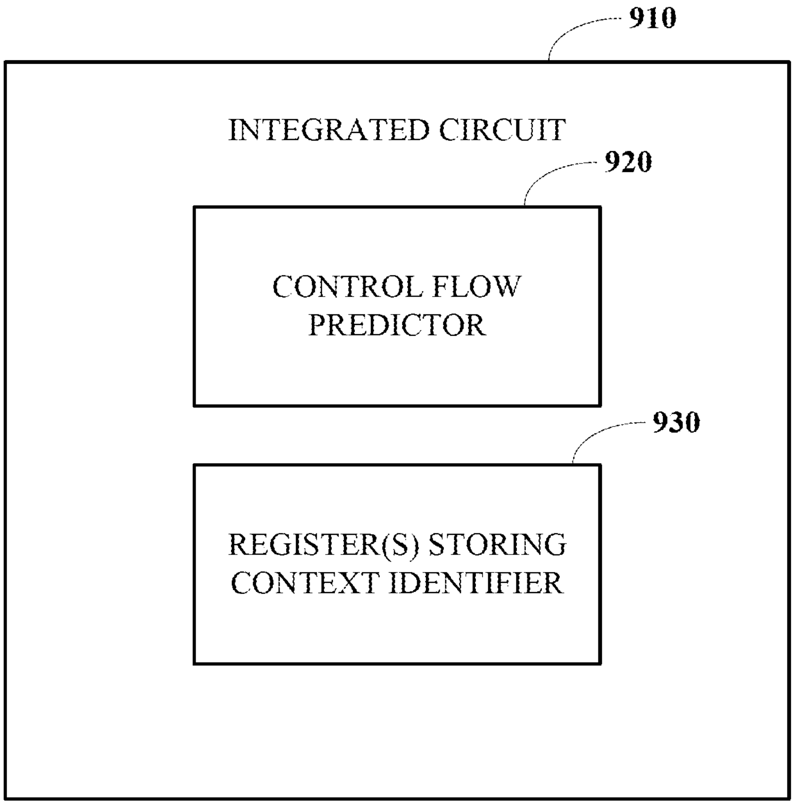
FIG. 9 is block diagram of an example of another integrated circuit for executing instructions with secure control flow prediction.

FIG. 9 is block diagram of an example of another integrated circuit 910 for executing instructions with secure control flow prediction. For example, the integrated circuit 910 may be a processor, a microprocessor, a microcontroller, or an IP core, like the integrated circuit 110 shown in FIG. 1. The integrated circuit 910 includes a control flow predictor 920 like the control flow predictor 120 shown in FIG. 1. The control flow predictor 920 may implement a branch target address predictor that is shared between processes executing in separate security domains, contexts, or worlds. For example, the control flow predictor 920 may implement a branch target address predictor that is shared between a first process executing in a first security domain, context, or world and a second process executing in a second security domain, context, or world. The branch target address predictor may be used to predict a branch target address associated with an instruction (e.g., a target address associated with an indirect jump), as opposed to whether a branch instruction is "taken" or "not-taken." The control flow predictor 920 may be used by the first process during a first period of time, then after a domain, context, or world switch, may be used by the second process during a second period of time.

The control flow predictor 920 may implement the branch target address predictor (e.g., an indirect jump target predictor) to predict branch target addresses that are associated with branch instructions. For example, the control flow predictor 920 may implement the branch target address predictor 1010 of FIG. 10 and/or the branch target address predictor of FIG. 12. For example, the integrated circuit 110 may be used to implement the technique 1400 of FIG. 14. In some implementations, the branch target address predictor may be a TAGE predictor (e.g., the control flow predictor 920 may comprise a TAGE predictor). The control flow predictor 920 may have entries including branch target addresses associated with instructions. The entries may be indexed by a program counter and may be associated with context tags. A context tag may comprise a set of bits used for identifying ownership of an entry by a given process.

The integrated circuit 910 may also include one or more registers 930 storing a context identifier associated with a currently executing process. A process executing in a security domain, context, or world may be associated with a context identifier. A context identifier may comprise a set of bits used for identifying a process. For example, the context identifier stored in the one or more registers 930 may be updated every time the processor does a context switch to a different process, or switches from a user process to the operating system (kernel mode), or from the operating system to virtual machine hypervisor (hypervisor mode), or switches from a first security domain to a second security domain, or switches from a first world to a second world. In some implementations, the context identifier may be a PID. In some implementations, the context identifier may be a world identifier (WID), and the WID may be associated with privilege level (e.g., a user mode, a supervisor mode, or a machine mode). In some implementations, the context identifier may be associated with a security domain, and the security domain may be associated with a microarchitectural state of the integrated circuit.

During operation, a currently executing process may access an entry in the control flow predictor 920, such as for obtaining a prediction for a branch target address associated with an instruction. The instruction may be an instruction stored in a instruction decode buffer like the instruction decode buffer 320 of FIG. 3. The context tag associated with the entry in the control flow predictor 920 may be compared to the context identifier associated with the currently executing process. Responsive to a match between the context identifier and the context tag (e.g., indicating ownership of the entry by the currently executing process), the control flow predictor 920 may provide the prediction (e.g., the branch target address in the entry) to the currently executing process. Responsive to a mismatch between the context identifier and the context tag (e.g., indicating ownership of the entry by a different process), the control flow predictor 920 may provide an alternate value (e.g., a fixed value, a calculated value, or a pseudorandom number, other than the branch target address in the entry) to the currently executing process. That is, the control flow predictor 920 may provide the alternate value even with an entry that is associated with the instruction existing in the control flow predictor 920 (e.g., the entry may be owned by a different process, resulting in a "collision"). The alternate value may be provided in place of the branch target address in the entry. In some implementations, the alternate value may be configured to invoke an exception when loaded into the program counter for executing a next instruction associated with the currently executing process.

As a result, a same control flow predictor (e.g., the control flow predictor 920) may be used between processes executing in separate security domains, contexts, or worlds while reducing the risk associated with a side-channel attack. For example, the control flow predictor 920 may be shared between a first process executing in a first security domain, context, or world and a second process executing in a second security domain, context, or world, regardless of the first process potentially being a victim process and the second process potentially being an attacker process. The risk associated with a side-channel attack may be reduced in a controlled way by configuring the control flow predictor 920 to provide the alternate value, which may be a known, predetermined value, responsive to the mismatch. This may limit, for example, the second process (e.g., the potential attacker process) in its ability to train the control flow predictor 920 for the first process (e.g., the potential victim process), while allowing both processes to use the control flow predictor 920.

Figure 10:
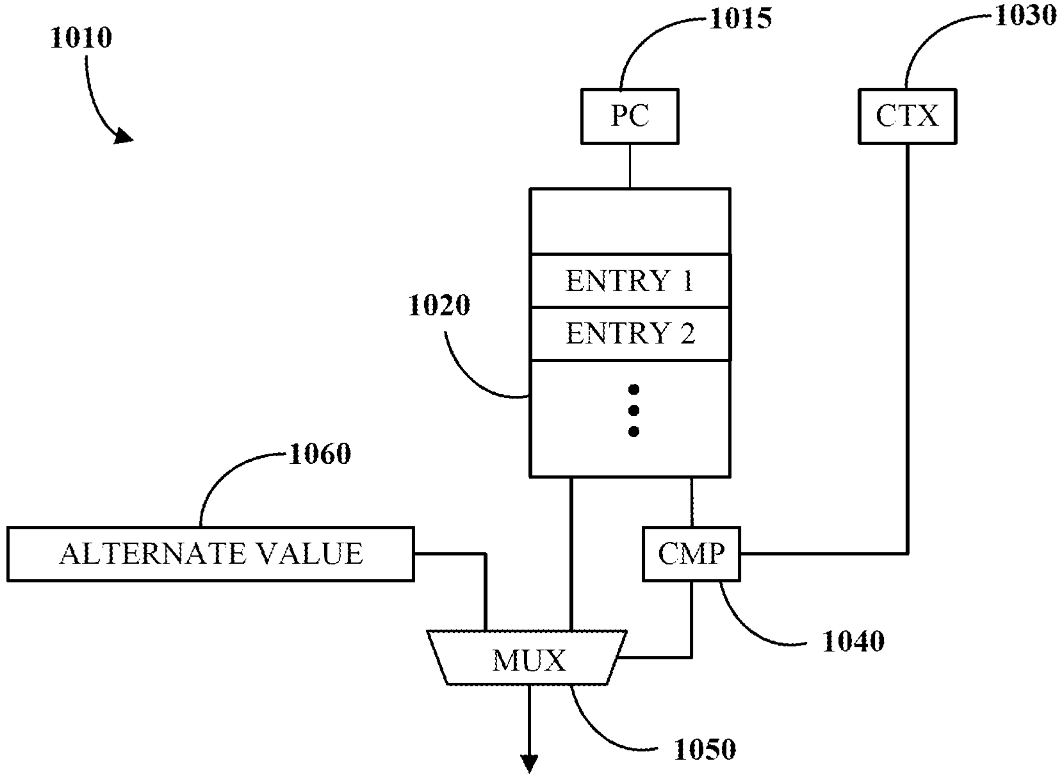
FIG. 10 is block diagram of an example of a branch target address predictor for secure control flow prediction.

FIG. 10 is block diagram of an example of a branch target address predictor 1010 for secure control flow prediction.

The branch target address predictor 1010 may be implemented by the control flow predictor 920 of FIG. 9. In some implementations, the branch target address predictor 1010 may be a TAGE predictor. The branch target address predictor 1010 may include a table 1020 including entries (e.g., “entry 1,” “entry 2,” and so forth) providing branch target address predictions associated with instructions. The entries may be indexed by program counter bits 1015 (“PC”), which may comprise bits of a program counter used by a currently executing process (e.g., the lower 8 bits of the program counter). For example, the table 1020 may comprise 256 entries indexed by the lower 8 bits of the program counter. The entries may be associated with context tags that may indicate ownership of the entries by a given process.

During operation, a currently executing process may access the branch target address predictor 1010 for obtaining a prediction for a branch target address for an instruction. The instruction may be stored in an instruction decode buffer like the instruction decode buffer 320 of FIG. 3. A program counter used by the currently executing process may point to an address of the instruction, and bits of the program counter (e.g., the program counter bits 1015, such as the lower 8 bits of the program counter) may be used to access the entry in the table 1020 that is associated with the instruction (e.g., “entry 1,” indexed by the program counter bits 1015). A context identifier 1030 (“CTX”) may permit access to the entry by the currently executing process. The context identifier 1030 may comprise a set of bits used for identifying the currently executing process (e.g., 2 bits). The context identifier 1030 may be accessed from one or more registers like the one or more registers 930 shown in FIG. 9. A comparator 1040 may compare the context tag associated with the entry in the table 1020 (e.g., “entry 1”) to the context identifier 1030 associated with the currently executing process.

Responsive to a mismatch between the context tag associated with the entry and the context identifier 1030, a selector 1050 (e.g., “MUX,” which could be a multiplexor) may select to provide an alternate value 1060 in place of the branch target address (e.g., the prediction for the branch target address of the instruction) included in the entry. That is, the branch target address predictor 1010 may provide the alternate value 1060 even with an entry that is associated with the instruction existing in the table 1020 (e.g., the entry may be owned by a different process, resulting in a “collision”). In other words, the mismatch may cause the prediction to be blocked. The branch target address predictor 1010 may also provide the alternate value 1060 if an entry that is associated with the instruction stored in the instruction decode buffer does not exist in the table 1020. The currently executing process may then use the alternate value 1060, such as by loading the alternate value 1060 in the program counter for executing a next instruction. In some implementations, the alternate value 1060 may be a fixed value, other than the branch target address in the entry. For example, the alternate value 1060 could be all 1’s or all 0’s. The fixed value may advantageously be used to provide a controlled result. In some implementations, the alternate value 1060 may be a calculated value, other than the branch target address in the entry. The calculated value may also be used to provide a controlled result. In some implementations, the alternate value may be a pseudorandom number generated by a pseudorandom number generator (PRNG). In some implementations, the alternate value 1060 may be configured to invoke a misprediction. In some implementations, the alternate value 1060 may be configured to cause an exception when loaded into the program counter for executing a next instruction associated with the currently executing process. For example, attempting to access an address including a fixed value of all 0’s may cause an exception to occur.

Responsive to a match between the context tag associated with the entry and the context identifier 1030, the selector 1050 may select to provide the branch target address (e.g., the prediction for the branch target address of the instruction) included in the entry in place of the alternate value 1060. The currently executing process may then use the branch target address, such as by loading the branch target address in the program counter for executing a next instruction. This may cause a jump to the branch target address during program execution, such as a jump to an indirect branch target address.

In some implementations, following a mismatch, and responsive to validation of a branch target address prediction for an instruction (e.g., after the instruction retires and the correct branch target address is known), the context tag associated with the entry for an instruction may be updated to match the context identifier that is associated with the currently executing process (e.g., the context identifier 1030). This may permit the currently executing process to use the entry in the table (e.g., take ownership of the entry) and may prevent other processes from using the entry (e.g., another process may be “evicted” from using the entry). For example, a context tag associated with an entry in a table may be updated to match a context identifier that is associated with a currently executing process, such as via a prediction update circuit like the prediction update circuit 450 shown in FIG. 4.

In some implementations, the context tag associated with the entry might not update to match the context identifier of the currently executing process until the currently executing process accesses the entry a predetermined number of times. For example, if the currently executing process accesses the entry one time, then the context tag associated with the entry might not update to match the context identifier of the currently executing process. If the currently executing process accesses the entry multiple times (e.g., which may be determined by a confidence counter), then the context tag associated with the entry may then be updated to match the context identifier of the currently executing process. This may provide hysteresis control with respect to ownership of the entry by a process.

In some implementations, the entries in the table 1020 may be indexed by the context identifier 1030 (e.g., as opposed to being index by the program counter bits 1015), including via a hash function. For example, the entries in the table 1020 may be indexed by a hash function using bits of the context identifier 1030. In some implementations, the entries in the table 1020 may be indexed by a combination of the context identifier 1030 and the program counter bits 1015, including via a hash function. For example, the entries in the table 1020 may be indexed by a hash function using bits of the context identifier 1030 (e.g., 2 bits) and bits of the program counter used by the currently executing process (e.g., the lower 8 bits of the program counter).

Figure 11:
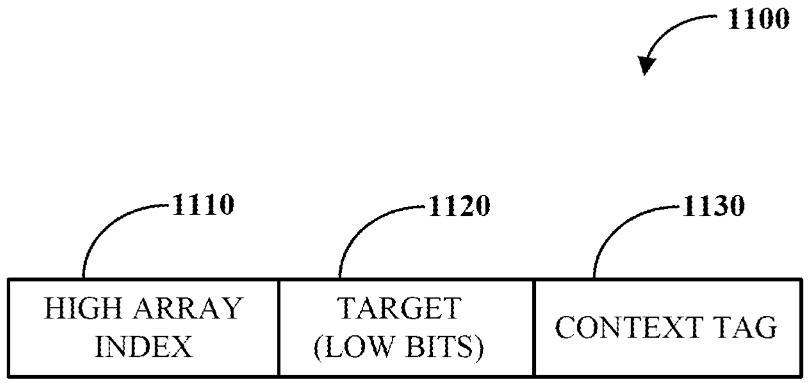
FIG. 11 is an example of an entry in a branch target address predictor for secure control flow prediction

FIG. 11 is an example of an entry 1100 in a branch target address predictor for secure control flow prediction. The entry 1100 could be an entry in the table 1020 shown in FIG. 11 (e.g., “entry 1”). The entry 1100 may include multiple fields, such as high array index field 1110, a lower-bit target address field 1120, and/or a context tag 1130. The high array index field 1110 and the lower-bit target address field 1120 may implement a branch target address (e.g., the prediction for a branch target address of an instruction). For example, the high array index field 1110 may comprise upper or higher order bits associated with a branch target address (e.g., 4 bits), and the lower-bit target address field 1120 may comprise lower order bits associated with the branch target address (e.g., 20 bits). The context tag 1130 may comprise a set of bits used for identifying ownership of the entry by a given process (e.g., 2 bits). For example, the currently executing process may or may not be the process that owns the entry. In some implementations, the entry 1100 may be a 26-bit value. A branch target address predictor may use bits stored in a program counter to index the entry in a table.

Figure 12:
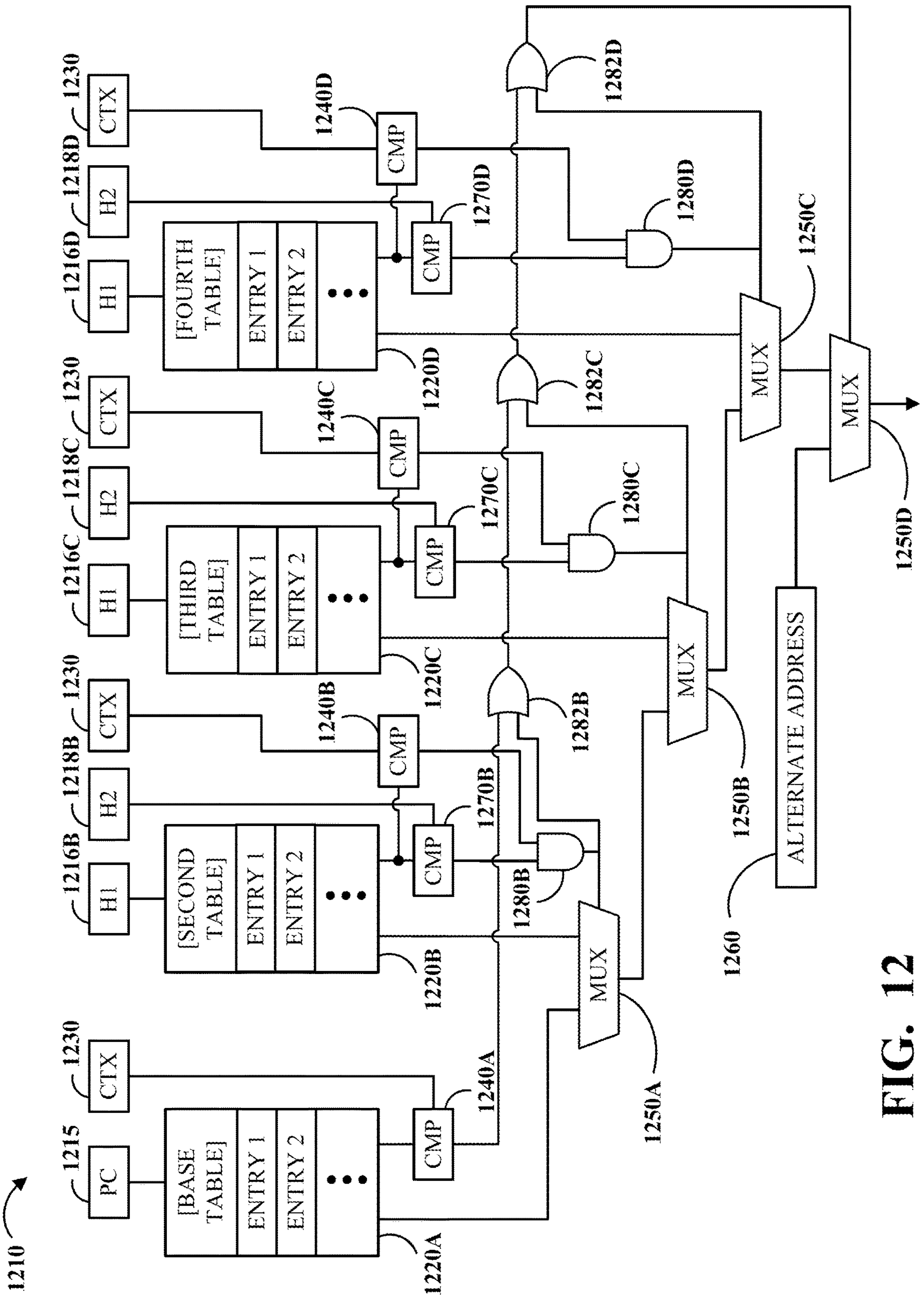
FIG. 12 is block diagram of an example of another branch target address predictor for secure control flow prediction.

FIG. 12 is block diagram of another example of a branch target address predictor 1210 for secure control flow prediction. The branch target address predictor 1210 may be implemented by the control flow predictor 920 of FIG. 9. For example, the branch target address predictor 1210 may be a TAGE predictor. The branch target address predictor 1210 may include multiple components with tables, such as tables 1220A through 1220D. The first table (e.g., the table 1220A) may be a "base table" for providing a first prediction that is a default prediction of a branch target address associated with an instruction. The second table (e.g., the table 1220B) may be a table for providing a second prediction of the branch target address, associated with the same instruction, based on history bits (e.g., 10 history bits); the third table (e.g., the table 1220C) may be a table for providing a third prediction of the branch target address, associated with the same instruction, based on more history bits (e.g., 23 history bits); and the fourth table (e.g., the table 1220D) may be a table for providing a fourth prediction of the branch target address, associated with the same instruction, based on even more history bits (e.g., 47 history bits). The history bits may comprise bits stored in a history register, such as a global history register (GHR). The tables (e.g., the tables 1220A through 1220D) may comprise entries (e.g., "entry 1," "entry 2," and so forth) providing branch target address predictions associated with instructions. A table using more history bits (e.g., the table 1220D) may provide a prediction with greater accuracy than a table using fewer history bits (e.g., the table 1220B) or a table using no history bits (e.g., the table 1220A).

The entries of the first table (e.g., the table 1220A) may be indexed by program counter bits 1215 ("PC") that may comprise bits of a program counter used by a currently executing process (e.g., the lower 8 bits of the program counter). For example, the table 1220A may comprise 256 entries indexed by the lower 8 bits of the program counter. The entries in the table 1220A may be associated with context tags that may indicate ownership of the entries by a given process. The entries of the second table (e.g., the table 1220B) may be indexed by a hash function 1216B ("H1") using bits of the program counter used by the currently executing process (e.g., the lower 8 bits of the program counter) and using history bits (e.g., 10 history bits stored in the history register). The hash function 1216B may be used to compute a table tag, and the table tag may be used to determine the entry in the table 1220B. For example, the table 1220B may comprise 64 entries indexed by the table tag. The entries in the table 1220B may be associated with context tags that may indicate ownership of the entries by a given process. The entries of the third table (e.g., the table 1220C) may be indexed by a hash function 1216C ("H1") using bits of the program counter used by the currently executing process (e.g., the lower 8 bits of the program counter) and using more history bits (e.g., 23 history bits stored in the history register). The hash function 1216C may be used to compute another table tag, and the table tag may be used to determine the entry in the table 1220C. For example, the table 1220C may comprise 64 entries indexed by the table tag. The entries in the table 1220C may be associated with context tags that may indicate ownership of the entries by a given process. The entries of the fourth table (e.g., the table 1220D) may be indexed by a hash function 1216D ("H1") using bits of the program counter used by the currently executing process (e.g., the lower 8 bits of the program counter) and using more history bits (e.g., 47 history bits stored in the history register). The hash function 1216D may be used to compute another table tag, and the table tag may be used to determine the entry in the table 1220D. For example, the table 1220D may comprise 64 entries indexed by the table tag. The entries in the table 1220D may be associated with context tags that may indicate ownership of the entries by a given process. Greater or lesser numbers of components with tables including entries may be implemented in this way.

During operation, a currently executing process may access the branch target address predictor 1210 for obtaining a prediction for a branch target address for an instruction. The instruction may be stored in an instruction decode buffer like the instruction decode buffer 320 of FIG. 3. The tables (e.g., the table 1220A through 1220D) may be accessed simultaneously with the table providing the most accurate prediction possibly providing the final prediction result. A program counter used by the currently executing process may point to an address of the instruction, and bits of the program counter (e.g., the program counter bits 1215, such as the lower 8 bits of the program counter) may be used to access an entry in the table 1220A that is associated with the instruction (e.g., "entry 1," indexed by the program counter bits 1215). If the entry is in the table 1220A, the branch target address in the entry may be provided as a first prediction (e.g., a default prediction) to a first input of a selector 1250A (e.g., "MUX," which could be a multiplexor). A context identifier 1230 ("CTX") may comprise a set of bits used for identifying the currently executing process (e.g., 2 bits). The context identifier 1230 may be accessed from one or more registers like the one or more registers 930 shown in FIG. 9. A comparator 1240A may compare the context tag associated with the entry in the table 1220A (e.g., "entry 1") to the context identifier 1230 associated with the currently executing process. Responsive to a match between the context tag and the context identifier 1230, the comparator 1240A may provide a hit indication (e.g., asserted, or high) to prediction selection logic (e.g., to OR gate 1282B). Otherwise, the comparator 1240B may provide a miss indication (e.g., de-asserted, or low) to the prediction selection logic, such as when the entry is not in the table 1220A, or responsive to a mismatch between the context tag associated with the entry and the context identifier 1230.

The hash function 1216B ("H1") may be used to access an entry in the table 1220B that is associated with the instruction (e.g., "entry 1," indexed by the hash function 1216B). In some implementations, the hash function 1216B may use bits of the program counter used by the currently executing process (e.g., the lower 8 bits of the program counter) and history bits (e.g., 10 history bits stored in the history register). If the entry is in the table 1220B, the branch target address in the entry may be provided as a second prediction to a second input of the selector 1250A. A hash function 1218B ("H2") may be used to determine whether the first input or the second input of the selector 1250A should be selected based on a preferred availability for the second prediction in the table 1220B (e.g., a selection preference for a hitting tagged predictor component using the most history bits). The hash function 1218B may use bits of the program counter used by the currently executing process (e.g., the lower 8 bits of the program counter) and the history bits (e.g., 10 history bits stored in the history register). A comparator 1270B may compare a result of the hash function 1218B to a table tag associated with an entry in the table 1220B. Further, a comparator 1240B may compare the context tag associated with the entry in the table 1220B (e.g., “entry 1”) to the context identifier 1230 associated with the currently executing process. When the entry is in the table 1220B (e.g., “entry 1,” responsive to a match between the result of the hash function 1218B and the table tag), and responsive to a match between the context tag associated with the entry and the context identifier 1230, the comparator 1270B and the comparator 1240B may provide a hit indication (e.g., asserted, or high) via prediction selection logic (e.g., via AND gate 1280B and OR gate 1282B). This hit indication may also select the second input at the selector 1250A (e.g., the second prediction from the table 1220B, which may be a prediction based on history). The output of the selector 1250A may be provided to a first input of a selector 1250B (e.g., “MUX,” which could be another multiplexor). Otherwise, the comparator 1270B and the comparator 1240B may provide a miss indication (e.g., de-asserted, or low) via the prediction selection logic, such as when the entry is not in the table 1220B, or responsive to a mismatch between the context tag associated with the entry and the context identifier 1230. This may select the first input of the selector 1250A (e.g., the first prediction from the table 1220A, which may be the default prediction). The logical OR gate 1282B may provide an output to a logical OR gate 1282C, e.g., indicating whether the context tag and the context identifier 1230 match for either the table 1220A or the table 1220B.

The hash function 1216C (“H1”) may be used to access an entry in the table 1220C that is associated with the instruction (e.g., “entry 1,” indexed by the hash function 1216C). In some implementations, the hash function 1216C may use bits of the program counter used by the currently executing process (e.g., the lower 8 bits of the program counter) and more history bits (e.g., 23 history bits stored in the history register). If the entry is in the table 1220C, the branch target address in the entry may be provided as a third prediction to a second input of the selector 1250B. A hash function 1218C (“H2”) may be used to determine whether the first input or the second input of the selector 1250B should be selected based on a preferred availability for the third prediction in the table 1220C (e.g., a selection preference for a hitting tagged predictor component using the most history bits). The hash function 1218C may use bits of the program counter used by the currently executing process (e.g., the lower 8 bits of the program counter) and the more history bits (e.g., 23 history bits stored in the history register). A comparator 1270C may compare a result of the hash function 1218C to a table tag associated with an entry in the table 1220C. Further, a comparator 1240C may compare the context tag associated with the entry in the table 1220C (e.g., “entry 1”) to the context identifier 1230 associated with the currently executing process. When the entry is in the table 1220C (e.g., “entry 1,” responsive to a match between the result of the hash function 1218C and the table tag), and responsive to a match between the context tag associated with the entry and the context identifier 1230, the comparator 1270C and the comparator 1240C may provide a hit indication (e.g., asserted, or high) via prediction selection logic (e.g., via AND gate 1280C and OR gate 1282C). This hit indication may also select the second input at the selector 1250B (e.g., the third prediction from the table 1220C). The output of the selector 1250B may be provided to a first input of a selector 1250C (e.g., “MUX,” which could be another multiplexor). Otherwise, the comparator 1270C and the comparator 1240C may provide a miss indication (e.g., de-asserted, or low) via the prediction selection logic, such as when the entry is not in the table 1220C, or responsive to a mismatch between the context tag associated with the entry and the context identifier 1230. This may select the first input of the selector 1250B (e.g., the first prediction from the table 1220A or the second prediction from the table 1220B). The logical OR gate 1282C may provide an output to a logical OR gate 1282D, e.g., indicating whether the context tag and the context identifier 1230 match (e.g., hit) for an entry in any of the tables 1220A through 1220C.

The hash function 1216D (“H1”) may be used to access an entry in the table 1220D that is associated with the instruction (e.g., “entry 1,” indexed by the hash function 1216D). In some implementations, the hash function 1216D may use bits of the program counter used by the currently executing process (e.g., the lower 8 bits of the program counter) and even more history bits (e.g., 47 history bits stored in the history register). If the entry is in the table 1220D, the branch target address in the entry may be provided as a fourth prediction to a second input of the selector 1250C. A hash function 1218D (“H2”) may be used to determine whether the first input or the second input of the selector 1250C should be selected based on a preferred availability for the fourth prediction in the table 1220D (e.g., a selection preference for a hitting tagged predictor component using the most history bits). The hash function 1218D may use bits of the program counter used by the currently executing process (e.g., the lower 8 bits of the program counter) and the even more history bits (e.g., 47 history bits stored in the history register). A comparator 1270D may compare a result of the hash function 1218D to a table tag associated with an entry in the table 1220D. Further, a comparator 1240D may compare the context tag associated with the entry in the table 1220D (e.g., “entry 1”) to the context identifier 1230 associated with the currently executing process. When the entry is in the table 1220D (e.g., “entry 1,” responsive to a match between the result of the hash function 1218D and the table tag), and responsive to a match between the context tag associated with the entry and the context identifier 1230, the comparator 1270D and the comparator 1240D may provide a hit indication (e.g., asserted, or high) via prediction selection logic (e.g., via AND gate 1280D and OR gate 1282D). This hit indication may also select the second input at the selector 1250C (e.g., the fourth prediction from the table 1220D). The output of the selector 1250C may be provided to a first input of a selector 1250D (e.g., “MUX,” which could be another multiplexor). Otherwise, the comparator 1270D and the comparator 1240D may provide a miss indication (e.g., de-asserted, or low) via the prediction selection logic, such as when the entry is not in the table 1220D, or responsive to a mismatch between the context tag associated with the entry and the context identifier 1230. This may select the first input of the selector 1250C (e.g., the first prediction from the table 1220A, the second prediction from the table 1220B, or the third prediction from the table 1220C). The logical OR gate 1282D may provide an output to the selector 1250D, e.g., indicating whether the context tag and the context identifier 1230 match (e.g., hit) for an entry in any of the tables 1220A through 1220D.

If the prediction selection logic indicates that the context tag and the context identifier 1230 match for an entry in any of the tables 1020A through 1020D (e.g., a hit, or a match), the prediction selection logic may select a prediction for a branch target address via the first input of the selector 1250D (e.g., the first prediction from the table 1220A, the second prediction from the table 1220B, the third prediction from the table 1220C, or the fourth prediction from the table 1220D). The currently executing process may then use the prediction for the branch target address in the entry, such as by loading the branch target address in the program counter for executing a next instruction. This may cause a jump to the branch target address during program execution, such as a jump to an indirect branch target address.

If the prediction selection logic indicates that the context tag and the context identifier 1230 do not match for any entry in any of the tables 1220A through 1220D (e.g., a miss, or a mismatch), or if the entry is not in any of the tables, the prediction selection logic may select the second input of the selector 1250D to provide an alternate value 1260. That is, the branch target address predictor 1210 may provide the alternate value 1260 even with an entry that is associated with the instruction existing in one of the tables 1220A through 1220D (e.g., the entry may be owned by a different process, resulting in a "collision"). In other words, the mismatch may cause any predictions to be blocked. The branch target address predictor 1210 may also provide the alternate value 1260 if an entry that is associated with the instruction stored in the instruction decode buffer does not exist in any of the tables 1220A through 1220D. The currently executing process may then use the alternate value 1260, such as by loading the alternate value 1260 in the program counter for executing a next instruction. In some implementations, the alternate value 1260 may be a fixed value, other than the branch target address in an entry in any of the tables 1020A through 1020D. For example, the alternate value 1260 could be all 1's or all 0's. The fixed value may advantageously be used to provide a controlled result. In some implementations, the alternate value 1260 may be a calculated value, other than the branch target address in the entry in any of the tables 1020A through 1020D. The calculated value may also be used to provide a controlled result. In some implementations, the alternate value may be a pseudorandom number generated by a PRNG. In some implementations, the alternate value 1260 may be configured to invoke a misprediction. In some implementations, the alternate value 1260 may be configured to cause an exception when loaded into the program counter for executing a next instruction associated with the currently executing process. For example, attempting to access an address including a fixed value of all 0's may cause an exception to occur.

Thus, the branch target address predictor 1210 may use selectors (e.g., a network of multiplexors, such as the selectors 1250A through 1250D) and prediction selection logic (e.g., a network of gates, such as the logical AND gates 1280B through 1280D, and the logical OR gates 1282B through 1282D) to select between: (1) a branch target address that is a prediction based on the most history available from a provider table, or (2) an alternate value in place of a prediction for a branch target address. Responsive to a mismatch between the context tag associated with an entry in any table and the context identifier 1230, the prediction selection logic may select to provide the alternate value 1260 in place of a prediction. In other words, the mismatch may cause any predictions to be blocked. Responsive to a match between a context tag associated with an entry in any table and the context identifier 1230, the prediction selection logic may select to provide a prediction in place of the alternate value 1260. Further, the selectors may select to provide the prediction that is based on the most history available (e.g., using a provider table that uses the most history bits).

In some implementations, following a mismatch, and responsive to validation of a branch target address prediction for an instruction (e.g., after the instruction retires and the correct branch target address is known), the context tag associated with the entry in a table (e.g., any one of the tables 1220A through 1220D) for an instruction may be updated to match the context identifier that is associated with the currently executing process (e.g., the context identifier 1230). This may permit the currently executing process to use the entry in the tables (e.g., take ownership of the entry) and may prevent other processes from using the entry (e.g., another process may be "evicted" from using the entry). For example, a context tag associated with an entry in a table (e.g., any one of the tables 1220A through 1220D) may be updated to match a context identifier that is associated with a currently executing process (e.g., the context identifier 1230), such as via a prediction update circuit like the prediction update circuit 450 shown in FIG. 4.

In some implementations, the context tag associated with the entry might not update to match the context identifier of the currently executing process until the currently executing process accesses the entry a predetermined number of times. For example, if the currently executing process accesses the entry one time, then the context tag associated with the entry might not update to match the context identifier of the currently executing process. If the currently executing process accesses the entry multiple times (e.g., which may be determined by a confidence counter), the context tag associated with the entry may then be updated to match the context identifier of the currently executing process. This may provide hysteresis control with respect to ownership of the entry by a process.

In some implementations, entries in one or more of the tables (e.g., one or more of the tables 1220A through 1220D) may be indexed using the context identifier 1230, including via a hash function. For example, the entries in the table 1220A may be indexed by a hash function using bits of the context identifier 1230; the entries in the table 1220B may be indexed by a hash function using bits of the context identifier 1230 and history bits (e.g., 10 history bits); the entries in the table 1220C may be indexed by a hash function using bits of the context identifier 1230 and more history bits (e.g., 23 history bits); and the entries in the table 1220D may be indexed by a hash function using bits of the context identifier 1230 and even more history bits (e.g., 47 history bits). In some implementations, the entries in the table 1020 may be indexed by a combination of the context identifier 1230, bits of the program counter used by the currently executing process, and/or history bits, including via a hash function. For example, the entries in the table 1220A may be indexed by a hash function using bits of the context identifier 1230 (e.g., 2 bits) and bits of the program counter used by the currently executing process (e.g., the lower 8 bits of the program counter); the entries in the table 1220B may be indexed by a hash function using bits of the context identifier 1230 (e.g., 2 bits), bits of the program counter used by the currently executing process (e.g., the lower 8 bits of the program counter), and history bits (e.g., 10 history bits); the entries in the table 1220C may be indexed by a hash function using bits of the context identifier 1230 (e.g., 2 bits), bits of the program counter used by the currently executing process (e.g., the lower 8 bits of the program counter), and more history bits (e.g., 23 history bits); and the entries in the table

1220D may be indexed by a hash function using bits of the context identifier 1230 (e.g., 2 bits), bits of the program counter used by the currently executing process (e.g., the lower 8 bits of the program counter), and even more history bits (e.g., 47 history bits).

In some implementations, the branch target address predictor 1210 may implement multiple sets of history bits, such as via multiple global history registers (GHRs) in a register file, with each GHR storing a set of history bits. A set of history bits, stored in a GHR, may be selected based on the context identifier 1230, including via a hash function. For example, a GHR in the register file may be indexed by a hash function using bits of the context identifier 1230. The set of history bits, selected using the context identifier 1230, may be used by the multiple components with tables in the branch target address predictor 1210, such as the tables 1220B through 1220D.

Figure 13:
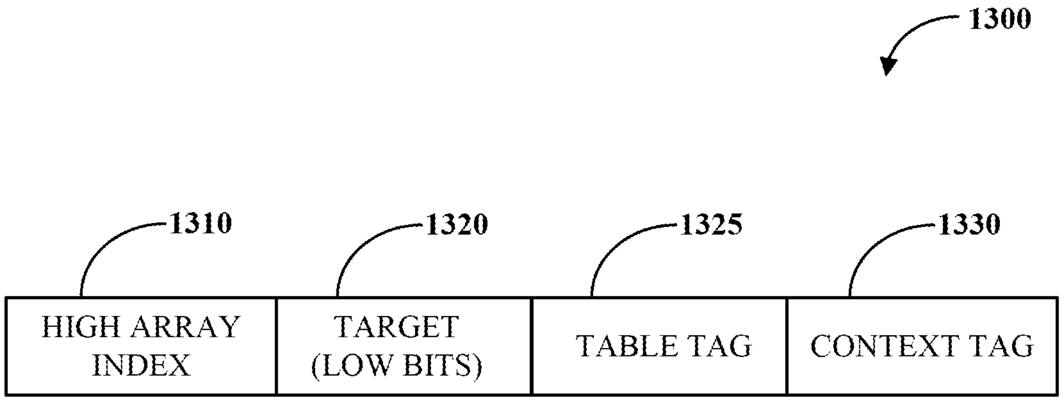
FIG. 13 is an example of an entry in a table of a multi-component branch target address predictor for secure control flow prediction

FIG. 13 is an example of an entry 1300 in a table of a multi-component branch target address predictor for secure control flow prediction. The entry 1300 could be an entry in a table of the branch target address predictor 1210 shown in FIG. 12 (e.g., "entry 1" in the table 1220A). The entry 1300 may include multiple fields, such as high array index field 1310, a lower-bit target address field 1320, a table tag 1325, and/or a context tag 1330. The high array index field 1310 and the lower-bit target address field 1320 may implement a branch target address (e.g., the prediction for a branch target address of an instruction). For example, the high array index field 1310 may comprise upper or higher order bits associated with a branch target address (e.g., 4 bits), and the lower-bit target address field 1320 may comprise lower order bits associated with the branch target address (e.g., 20 bits). The table tag 1325 may comprise a set of bits used for indexing the entry by a currently executing process (e.g., 8 bits). For example, a branch target address predictor may use the table tag 1325 to index an entry in the table, such as by computing a hash function using bits stored in the program counter and history bits. The context tag 1330 may comprise a set of bits used for identifying ownership of the entry by a given process (e.g., 2 bits). For example, the currently executing process may or may not be the process that owns the entry. In some implementations, the entry 1300 may be a 34-bit value.

Figure 14:
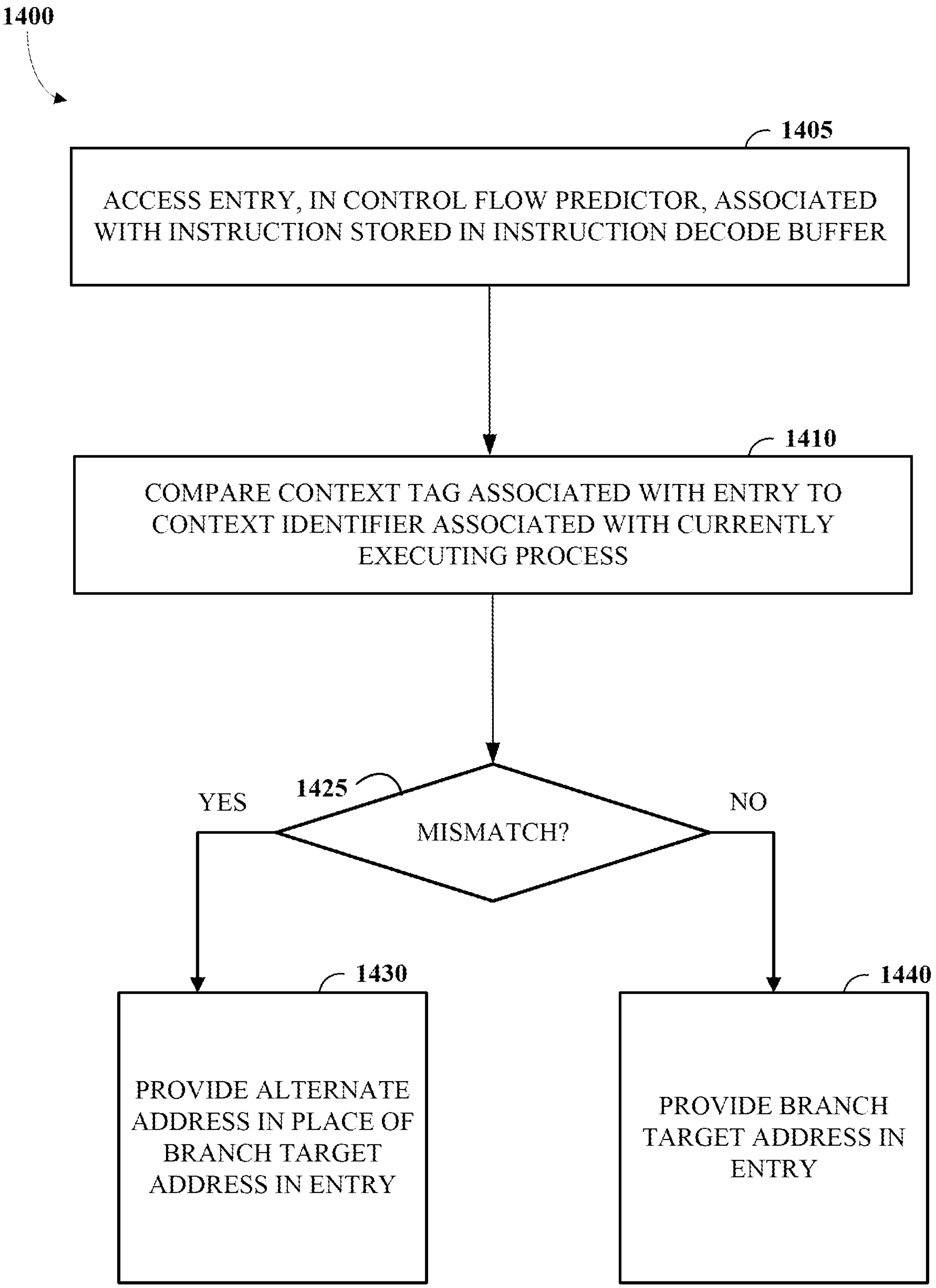
FIG. 14 is flow chart of an example of a technique for determining, based on a context tag, whether an entry of a control flow predictor is available for use by a current executing process.

FIG. 14 is flow chart of an example of a technique 1400 for determining, based on a context tag, whether an entry of a control flow predictor is available for use by a current executing process. The technique 1400 includes accessing 1405 an entry, in a control flow predictor, that is associated with an instruction stored in an instruction decode buffer. For example, the control flow predictor could be the control flow predictor 920 shown in FIG. 9. The control flow predictor may implement a branch target address predictor that is shared between processes executing in separate security domains, contexts, or worlds. The entry may include a branch target address that is a prediction, and the entry may be associated with a context tag. For example, the branch target address predictor could be the branch target address predictor 1010 shown in FIG. 10 or the branch target address predictor 1210 shown in FIG. 12. In some implementations, the branch target address predictor may include multiple components with tables. For example, the branch target address predictor may be a TAGE predictor implemented by the control flow predictor.

The technique 1400 also includes comparing 1410 the context tag associated with the entry to a context identifier associated with a currently executing process. For example, the context identifier may be stored in one or more registers (e.g., the one or more registers 930) of the integrated circuit (e.g., the integrated circuit 910). For example, comparing 610 the context tag associated with the entry to the context identifier associated with a currently executing process may include checking for an exact match between the context tag and the context identifier. For example, comparing 610 the context tag and the context identifier may include checking for an exact match between bits. In some implementations, the context identifier may be a PID. In some implementations, the context identifier may be a WID, and the WID may be associated with privilege level (e.g., a user mode, a supervisor mode, or a machine mode). In some implementations, the context identifier may be associated with a security domain, and the security domain may be associated with a privilege mode, a set of permissions associated with memory regions, and/or a microarchitectural state of the integrated circuit.

If (at operation 1425) a mismatch is detected ("Yes"), then, responsive to a mismatch between the context tag and the context identifier, the technique 1400 includes providing 1430 an alternate value in place of the branch target address. If (at operation 1425) a mismatch is not detected ("No"), then, responsive to a match between the context tag and the context identifier, the technique 1400 includes providing 1440 the branch target address in the entry (e.g., the prediction). In some implementations, following the mismatch (e.g., the providing 1430 step), and responsive to validation of a branch target address prediction for an instruction, the context tag of an entry in a table that is associated with an instruction may be updated to match the context identifier that is associated with the currently executing process. This may permit the currently executing process to use the entry in the tables (e.g., take ownership of the entry) and may prevent other processes from using the entry (e.g., another process may be "evicted" from using the entry). In some implementations, the context tag associated with the entry might not update to match the context identifier of the currently executing process until the currently executing process accesses the entry a predetermined number of times. For example, if the currently executing process accesses the entry one time, then the context tag associated with the entry might not update to match the context identifier of the currently executing process. If the currently executing process accesses the entry multiple times (e.g., which may be determined by a confidence counter), the context tag associated with the entry may then be updated to match the context identifier of the currently executing process. This may provide hysteresis control with respect to ownership of the entry by a process.

Figure 15:
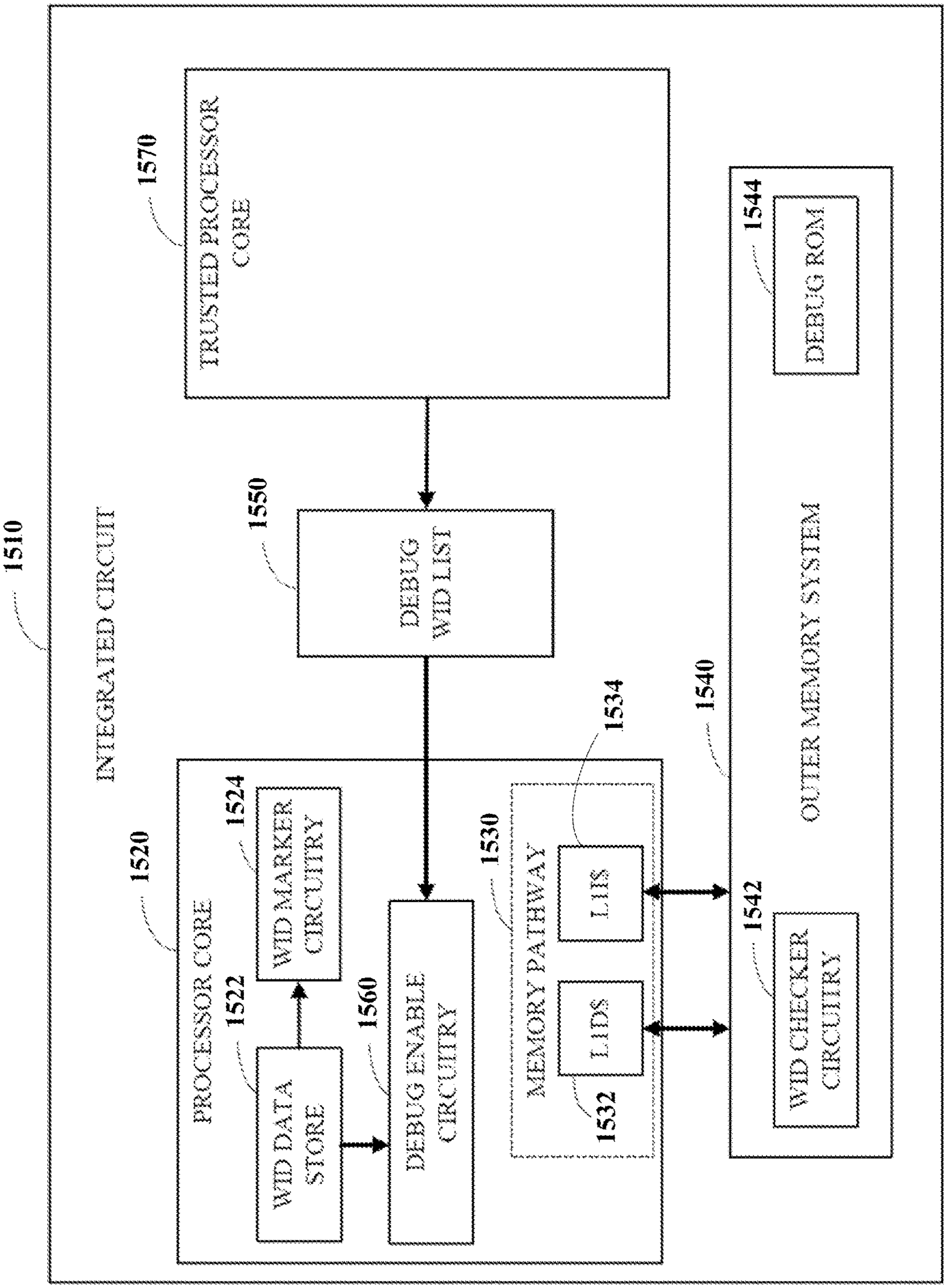
FIG. 15 is a block diagram of an example of an integrated circuit for debugging software in a system on a chip with a securely partitioned memory space.

FIG. 15 is a block diagram of an example of an integrated circuit 1510 for debugging software in a system on a chip with a securely partitioned memory space. The integrated circuit 1510 includes a processor core 1520 configured to execute instructions, including a data store 1522 configured to store one or more "world identifiers." For example, a context identifier, as discussed above in connection with FIGS. 1-14, may correspond to a world identifier. The integrated circuit 1510 includes an outer memory system 1540 configured to store instructions and data. The processor core 1520 is configured to tag memory requests transmitted on a bus of the integrated circuit 1510 by the processor core 1520 with a first world identifier to confirm authorization to access a portion of memory space addressed by the memory requests. For example, first world identifier may correspond to a context identifier. The integrated circuit 1510 includes a data store 1550 configured to store a debug world list that specifies which world identifiers supported by the integrated circuit 1510 are authorized for debugging. The integrated circuit 1510 includes a debug enable circuitry 1560 configured to generate a debug enable signal based on the first world identifier and the debug world list, wherein the processor core 1520 is configured to jump to debug handler instructions in response to a debug exception or ignore the debug exception depending on the debug enable signal.

The integrated circuit 1510 includes a processor core 1520 configured to execute instructions, including a data store 1522 (e.g., one or more registers) configured to store a first world identifier. For example, multiple world identifiers that are respectively used by processes executed by the processor core 1520 in different privilege modes may be stored in the data store 1522. In some implementations, a first world identifier is one of multiple world identifiers stored in the processor core 1520 that are each associated with different privilege modes (e.g., machine mode, supervisor mode, and user mode). For example, the integrated circuit 1510 may implement a SiFive WorldGuard. In some implementations, a world identifier (e.g., a first world identifier) is associated with all processes executed by the processor core 1520 (e.g., regardless of their privilege modes). In some implementations, the data store 1522 includes a register storing a world identifier that has a width of n bits, indicating the number of worlds supported by the integrated circuit 1510. This register may be used to mark transactions going out of the master. The data store 1522 may be memory mapped to enable a trusted core 1570 to write to the data store 1522 to assign one or more world identifiers to one or more masters of the processor core 1520. In some implementations (not shown in FIG. 15), the data store 1522 may be positioned outside of the processor core 1520. For example, the data store 1522 may be accessed by the processor core 1520 via outside wires extending out of the processor core 1520.

The processor core 1520 includes a world identifier marker circuitry 1524. The world identifier marker circuitry 1524 may be configured to tag memory requests transmitted by the processor core on a bus of the integrated circuit 1510 with a world identifier to confirm authorization to access a portion of memory space addressed by the memory requests. For example, in the TileLink bus protocol, the userField field may be used to transmit the world identifier value with the request. For example, the world identifier marker circuitry 1524 may include logic to select a world identifier associated with a privilege mode of a current process running on the processor core 1520 to tag an access request for a resource (e.g., memory or a peripheral).

In some implementations, a first world identifier (stored by the data store 1522) is associated with a debugged process running on the processor core 1520 that is being debugged, and the processor core 1520 (e.g., using the world identifier marker circuitry 1524) is configured to use the first world identifier to tag request on a bus generated by debug handler instructions (e.g., stored in the debug ROM 1544) that access resources in a memory space when the debug handler instructions are executed responsive to a debug exception caused by the debugged process. For example, the debug handler instructions may be executed using a privilege mode associated with the debugged process. In some implementations, the privilege mode used by the debugged process is determined by checking privilege level bits in a debug control and status register when the debug handler instructions are executed responsive to a debug exception caused by the debugged process.

The processor core 1520 includes a memory pathway 1530 that enables the processor core 1520 to access instructions and data stored in the outer memory system 1540. In this example, the memory pathway 1530 includes an L1 data cache 1532 and an L1 instruction cache 1534 and associated memory management logic to increase the efficiency of memory operations acting on the outer memory system 1540. In some implementations, the processor core 1520 uses physical addresses. In some implementations, the processor core 1520 uses virtual addresses and the memory pathway 1530 may include one or more translation lookaside buffers (TLBs). The processor core 1520 may use the memory pathway 1530 to load instructions and data from the outer memory system 1540. The processor core 1520 may use the memory pathway 1530 to store data in the outer memory system 1540.

The integrated circuit 1510 includes an outer memory system 1540 configured to store instructions and data. The outer memory system 1540 may include one or more memories. The outer memory system 1540 may include one or more layers of cache. The outer memory system 1540 may include memory mapped ports to one or more peripherals. The processor core 1520 may be configured to (e.g., using the world identifier marker circuitry 1524 and the data store 1522 storing the one or more world identifiers) tag memory requests transmitted on a bus of the integrated circuit 1510 by the processor core 1520 with a world identifier (e.g., the first world identifier) to confirm authorization to access a portion of memory space addressed by the memory requests.

The outer memory system 1540 includes world identifier checker circuitry 1542 for resources (e.g., portions of memory or peripherals). For example, the world identifier checker circuitry 1542 for a resource may be configured to check a world identifier that has been used to tag a request on a bus for that resource against a stored world identifier or set of world identifiers for that resource. For example, a world identifier or set of world identifiers for a resource (e.g., a portion of memory or a peripheral) may be stored by the world identifier checker circuitry 1542 and may be set by the trusted core 1570. For example, the world identifier checker circuitry 1542 may include a WorldGuard filter. For example, the world identifier checker circuitry 1542 may include a WorldGuard physical memory protection (PMP) mechanism.

The outer memory system 1540 includes a debug read only memory (ROM) that stores debug handler instructions that can be accessed and executed in response to a debug interrupt/exception raised by a debug instruction of a debugged process.

The integrated circuit 1510 includes a data store 1550 (e.g., a register) configured to store a debug world list that specifies which world identifiers supported by the integrated circuit are authorized for debugging. In some implementations, the debug world list is a bit mask with one bit for each world identifier supported by the integrated circuit. For example, the debug world list may be written to the data store 1550 by the trusted core 1570. For example, the debug world list may be set and locked during a boot routine.

The processor core 1520 includes a debug enable circuitry 1560 configured to generate a debug enable signal based on a first world identifier and the debug world list. The processor core 1520 is configured to jump to debug handler instructions in response to a debug exception or ignore the debug exception depending on the debug enable signal. For example, the debug enable signal may be a high or low voltage on a conductor of the integrated circuit 1510 that indicates whether a current process running on the processor core 1520 is authorized to use debug handler instructions (e.g., instructions stored in the debug ROM 1544). The first world identifier may be a currently applicable world identifier for the currently executing instructions in the processor core 1520 that is stored in the data store 1522. For example, in an active-high implementation, the debug enable signal is set high when the first world identifier is one of the world identifiers specified by the debug world list stored in the data store 1550 (e.g., the bit of the debug world list corresponding to the first world identifier is high), and the debug enable signal is set low when the first world identifier is not one of the world identifiers specified by the debug world list stored in the data store 1550 (e.g., the bit of the debug world list corresponding to the first world identifier is low). For example, in an active-low implementation, the debug enable signal is set low when the first world identifier is one of the world identifiers specified by the debug world list stored in the data store 1550, and the debug enable signal is set high when the first world identifier is not one of the world identifiers specified by the debug world list stored in the data store 1550.

The integrated circuit 1510 includes a trusted core 1570 that has write access to data stores (e.g., registers) storing world identifiers throughout the integrated circuit 1510 that are used to tag resource requests on one or more buses of the integrated circuit 1510. The trusted core 1570 may also have write access to data stores in world identifier checker circuitry 1542.

In some implementations (not shown in FIG. 15), the processor core 1520 may be the trusted core for its integrated circuit. For example, the trusted core can simply be the processor 1520 core running some trusted software in the context of a trusted world. When the world changes (e.g., from the trusted world identifier to another world identifier identifier), the processor core 1520 is not considered as trusted because its state is not the trusted state.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:

an instruction decode buffer configured to store instructions fetched from memory; and a control flow predictor with entries that include process identifiers and privilege levels, wherein the integrated circuit is configured to:

access a first process identifier and a first privilege level in a first entry of the control flow predictor, the first privilege level being one of a set of possible privilege levels, wherein the first entry is associated with an instruction stored in the instruction decode buffer;

compare the first process identifier and the first privilege level to a currently executing process identifier and a currently executing privilege level, respectively; and responsive to a mismatch between at least one of the first process identifier and the currently executing process identifier or the first privilege level and the currently executing privilege level, apply a constraint on speculative execution for the instruction, wherein the constraint prevents changes in a microarchitectural state of the integrated circuit caused by the speculative execution by preventing the speculative execution from modifying data stored in a cache of the integrated circuit prior to validation of a control flow prediction for the instruction.

2. The integrated circuit of claim 1, wherein the constraint on speculative execution disables using the first entry that is associated with the instruction.

3. The integrated circuit of claim 1, wherein the first entry that is associated with the instruction is discarded.

4. The integrated circuit of claim 1, wherein the constraint on the speculative execution causes the speculative execution to proceed based on a prediction for the instruction.

5. The integrated circuit of claim 1, wherein the control flow predictor includes a branch target buffer with the entries that include the process identifiers and the privilege levels.

6. An integrated circuit comprising:

a processor core configured to execute instructions;

an instruction decode buffer configured to store instructions fetched from memory; and a control flow predictor with entries that include branch target addresses associated with instructions stored in the instruction decode buffer, wherein the branch target addresses are predictions, and wherein the integrated circuit is configured to:

access a first entry of the entries that is associated with an instruction stored in the instruction decode buffer, wherein the first entry includes a first branch target address;

compare a context tag associated with the first entry to a context identifier associated with a currently executing process, wherein the context identifier corresponds to a first world identifier stored in a data store; and responsive to a mismatch between the context tag and the context identifier, provide an alternate value in place of the first branch target address, wherein the alternate value is configured to cause an exception that applies a constraint on speculative execution for the instruction, wherein the constraint prevents the speculative execution from modifying data stored in a cache of the integrated circuit prior to validation of a prediction for the instruction;

wherein the processor core is configured to tag memory requests with the first world identifier, and wherein the integrated circuit further comprises world identifier checker circuitry configured to check the first world identifier to determine authorization to access a portion of memory space addressed by the memory requests.

7. The integrated circuit of claim 6, wherein the control flow predictor includes a first table with a first set of entries for providing a first prediction based on a default prediction and a second table with second set of entries for providing a second prediction based on history, wherein the first table is indexed by bits of a program counter and the second table is indexed by a table tag computed by a hash function using bits of the program counter and history bits, and wherein the first entry, associated with the context tag, is in at least one of the first table or the second table.

8. The integrated circuit of claim 6, wherein the control flow predictor includes a first table with a first set of entries for providing a first prediction based on a default prediction and a second table with second set of entries for providing a second prediction based on history, and wherein the mismatch is configured to block the first prediction and the second prediction.

9. The integrated circuit of claim 6, wherein the control flow predictor comprises a tagged geometric length (TAGE) predictor.

10. The integrated circuit of claim 6, wherein the integrated circuit is configured to:

responsive to validation of the first branch target address for the instruction by the control flow predictor, update the context tag associated with the first entry that is associated with the instruction to the context identifier.

11. The integrated circuit of claim 6, wherein the currently executing process is executing in a security domain associated with a privilege mode, and wherein the context identifier is associated with the security domain and the privilege mode.

12. The integrated circuit of claim 6, further comprising:

a data store configured to store a first world identifier, wherein the processor core is configured to tag memory requests transmitted on a bus of the integrated circuit by the processor core with the first world identifier to confirm authorization to access a portion of memory space addressed by the memory requests.

13. A method comprising:

accessing a first entry among entries in a control flow predictor, wherein the first entry includes a first branch target address associated with an instruction stored in an instruction decode buffer, wherein the first branch target address is a prediction;

comparing a context tag associated with the first entry to a context identifier associated with a currently executing process, wherein the context identifier corresponds to a first world identifier;

tagging, by a processor core executing the currently executing process, memory requests with the first world identifier to confirm authorization to access a portion of memory space addressed by the memory requests;

checking, by world identifier checker circuitry, the first world identifier against a stored world identifier to determine authorization to access the portion of memory space; and responsive to a mismatch between the context tag and the context identifier, providing an alternate value in place of the first branch target address, wherein the alternate value is configured to cause an exception that applies a constraint on speculative execution for an instruction, wherein the constraint prevents the speculative execution from modifying data stored in a cache of an integrated circuit prior to validation of a prediction for the instruction.

14. The method of claim 13, wherein the control flow predictor includes a first table with a first set of entries for providing a first prediction based on a default prediction and a second table with second set of entries for providing a second prediction based on a history, wherein the first table is indexed by bits of a program counter and the second table is indexed by a table tag computed by a hash function using bits of the program counter and history bits, and wherein the first entry, associated with the context tag, is in at least one of the first table or the second table.

15. The method of claim 13, wherein the control flow predictor includes a first table with a first set of entries for providing a first prediction based on a default prediction and a second table with second set of entries for providing a second prediction based on a history, the method further comprising:

blocking the first prediction and the second prediction based on the mismatch.

16. The method of claim 13, further comprising:

responsive to validation of the first branch target address for the instruction by the control flow predictor, updating the context tag associated with the first entry that is associated with the instruction to the context identifier.

17. The method of claim 13, further comprising:

executing the currently executing process in a security domain associated with a privilege mode, wherein the context identifier is associated with the security domain and the privilege mode.

* * * * *